000

(12) United States Patent
Scannon et al.

(10) Patent No.: US 10,106,974 B2
(45) Date of Patent: Oct. 23, 2018

(54) FLEXIBLE MANUFACTURING SYSTEM

(71) Applicant: XOMA CORPORATION, Berkeley, CA (US)

(72) Inventors: Patrick J. Scannon, Berkeley, CA (US); Frank Bernard, American Canyon, CA (US); Alfred C. Dadson, Jr., Berkeley, CA (US); Robert S. Tenerowicz, Moraga Town, CA (US)

(73) Assignee: XOMA (US) LLC, Berkeley, CA (US)

( * ) Notice: Subject to any disclaimer, the term of this patent is extended or adjusted under 35 U.S.C. 154(b) by 12 days.

(21) Appl. No.: 15/349,298

(22) Filed: Nov. 11, 2016

(65) Prior Publication Data

US 2017/0058508 A1    Mar. 2, 2017

Related U.S. Application Data

(63) Continuation of application No. 13/129,073, filed as application No. PCT/US2009/069204 on Dec. 22, 2009.

(Continued)

(51) Int. Cl.
*C02F 1/00*         (2006.01)
*E04B 1/343*      (2006.01)
(Continued)

(52) U.S. Cl.
CPC .............. *E04B 1/343* (2013.01); *B23P 25/00* (2013.01); *C02F 1/001* (2013.01); *E04H 5/02* (2013.01); *G05B 19/4188* (2013.01); *E04B 2001/0053* (2013.01); *G05B 2219/31338* (2013.01); *Y02P 90/18* (2015.11); *Y02P 90/185* (2015.11); *Y02P 90/24* (2015.11); *Y10T 29/49* (2015.01); *Y10T 29/4998* (2015.01); *Y10T 29/51* (2015.01); *Y10T 29/534* (2015.01); *Y10T 29/53096* (2015.01)

(58) Field of Classification Search
None
See application file for complete search history.

(56) References Cited

U.S. PATENT DOCUMENTS

| 469,635 A | * | 2/1892 | Hale ......................... E06B 9/01 |
| | | | 52/106 |
| 1,957,511 A | | 5/1934 | Meyer |
| (Continued) | | | |

FOREIGN PATENT DOCUMENTS

| CA | 2269967 | 10/1999 |
| CN | 1293342 | 5/2001 |
| (Continued) | | |

OTHER PUBLICATIONS

BioPlan Associates, Inc., "Advances in Large-Scale Biopharmaceutical Manufacturing and Scale-Up Production, Second Edition," ASM Press (2007).

(Continued)

*Primary Examiner* — Avinash Savani
*Assistant Examiner* — Martha Becton
(74) *Attorney, Agent, or Firm* — Marshall, Gerstein & Borun LLP

(57) ABSTRACT

A flexible, multi-product, multi-technology, expandable facility for manufacturing products, such as biologicals, pharmaceuticals, or chemicals, and manufacturing processes using elements of such a facility.

13 Claims, 7 Drawing Sheets

Related U.S. Application Data

(60) Provisional application No. 61/227,658, filed on Jul. 22, 2009, provisional application No. 61/140,339, filed on Dec. 23, 2008.

(51) Int. Cl.
  *G05B 19/418* (2006.01)
  *B23P 25/00* (2006.01)
  *E04H 5/02* (2006.01)
  *E04B 1/00* (2006.01)

(56) References Cited

U.S. PATENT DOCUMENTS

| | | | | |
|---|---|---|---|---|
| 1,967,511 A | * | 7/1934 | Meyer | F41H 9/04 52/106 |
| 2,156,859 A | * | 5/1939 | Lowe | E04H 3/08 52/106 |
| 2,168,725 A | | 8/1939 | Whelan | |
| 3,115,819 A | | 12/1963 | Mahlmeister et al. | |
| 3,378,963 A | * | 4/1968 | Obata | E04H 3/08 108/86 |
| 3,456,829 A | | 7/1969 | Glassmeyer | |
| 3,678,639 A | | 7/1972 | Panitz | |
| D224,523 S | * | 8/1972 | Calevas | 52/79.7 |
| 3,742,932 A | * | 7/1973 | Greenspan | A61G 10/00 104/88.01 |
| 3,756,342 A | | 9/1973 | Burdick | |
| 3,925,673 A | | 12/1975 | Wright, Jr. | |
| 3,925,679 A | | 12/1975 | Berman et al. | |
| 4,255,912 A | * | 3/1981 | Kovacs | E04B 1/34331 52/222 |
| 4,267,769 A | | 5/1981 | Davis et al. | |
| 4,304,224 A | | 12/1981 | Fortney | |
| 4,327,529 A | | 5/1982 | Bigelow, Jr. et al. | |
| 4,409,889 A | * | 10/1983 | Burleson | F24F 3/161 454/187 |
| 4,549,472 A | | 10/1985 | Endo et al. | |
| 4,554,766 A | | 11/1985 | Ziemer et al. | |
| 4,599,829 A | * | 7/1986 | DiMartino, Sr. | E04B 1/3483 410/79 |
| 4,667,579 A | * | 5/1987 | Daw | B01L 1/04 454/187 |
| 4,667,580 A | * | 5/1987 | Wetzel | F24F 3/161 165/108 |
| 4,682,418 A | | 7/1987 | Tuss et al. | |
| 4,693,175 A | | 9/1987 | Hashimoto | |
| 4,694,736 A | | 9/1987 | Yamagata et al. | |
| 4,731,961 A | | 3/1988 | Bona | |
| 4,820,931 A | | 4/1989 | Dunbar | |
| 4,850,268 A | | 7/1989 | Saito et al. | |
| 4,851,018 A | * | 7/1989 | Lazzari | F24F 3/161 414/217 |
| 4,869,156 A | | 9/1989 | Hutton | |
| 4,883,512 A | * | 11/1989 | Griffis | B01D 46/00 135/121 |
| 4,923,352 A | * | 5/1990 | Tamura | B25J 21/005 29/722 |
| 4,970,834 A | * | 11/1990 | Polson | E04H 3/08 52/106 |
| 5,014,608 A | * | 5/1991 | Benson | F24F 3/161 454/187 |
| 5,029,518 A | | 7/1991 | Austin | |
| 5,152,814 A | * | 10/1992 | Nelson | A61G 10/005 55/385.2 |
| 5,163,517 A | | 11/1992 | Kozai et al. | |
| 5,192,348 A | * | 3/1993 | Ludwig | E04B 9/006 454/187 |
| 5,247,901 A | | 9/1993 | Landon et al. | |
| 5,259,812 A | * | 11/1993 | Kleinsek | B01L 1/04 312/1 |
| 5,277,654 A | * | 1/1994 | Fenn | F24F 3/161 454/141 |
| 5,279,632 A | | 1/1994 | Decker et al. | |
| 5,344,365 A | * | 9/1994 | Scott | H01L 21/67712 454/187 |
| 5,350,336 A | * | 9/1994 | Chen | F24F 3/161 454/187 |
| 5,353,557 A | * | 10/1994 | Lerner | E04H 3/08 52/106 |
| 5,380,682 A | * | 1/1995 | Edwards | G01J 5/0003 29/25.01 |
| 5,491,934 A | * | 2/1996 | Bigelow, Jr. | E04B 1/34321 52/143 |
| 5,511,594 A | * | 4/1996 | Brennan | A61J 3/00 141/100 |
| 5,562,539 A | * | 10/1996 | Hashimoto | F24F 3/161 454/140 |
| 5,626,786 A | | 5/1997 | Huntington et al. | |
| 5,641,354 A | | 6/1997 | Sakauchi et al. | |
| 5,656,491 A | * | 8/1997 | Cassani | B01J 19/004 422/129 |
| 5,706,846 A | | 1/1998 | Sutton | |
| 5,752,985 A | | 5/1998 | Nagafune et al. | |
| 5,755,479 A | * | 5/1998 | Lavin | A61G 1/04 296/19 |
| 5,795,356 A | * | 8/1998 | Leveen | C23C 14/568 29/25.01 |
| 5,947,430 A | * | 9/1999 | Ryan | F16F 15/073 248/163.1 |
| 6,132,309 A | * | 10/2000 | Panelli | F24F 3/161 169/54 |
| 6,179,358 B1 | * | 1/2001 | Hirayama | B60P 3/14 296/24.38 |
| 6,196,514 B1 | | 3/2001 | Kienholz | |
| 6,304,005 B1 | | 10/2001 | Aoki et al. | |
| 6,358,139 B1 | | 3/2002 | Renz | |
| 6,394,523 B1 | * | 5/2002 | Yoo | B60P 3/14 296/24.32 |
| 6,397,755 B1 | | 6/2002 | Kamler | |
| 6,450,411 B1 | | 9/2002 | Rash et al. | |
| 6,602,128 B1 | | 8/2003 | Spengler | |
| 6,869,457 B2 | | 3/2005 | Nakagawa | |
| 6,920,973 B2 | | 7/2005 | Koren et al. | |
| 6,960,236 B1 | | 11/2005 | Tamura et al. | |
| 6,969,102 B2 | | 11/2005 | Orischak et al. | |
| 6,990,715 B2 | | 1/2006 | Liu et al. | |
| 7,022,009 B2 | | 4/2006 | Kim | |
| 7,222,246 B2 | | 5/2007 | Pomaranski et al. | |
| 7,269,925 B2 | | 9/2007 | Lam | |
| 7,272,733 B2 | | 9/2007 | Pomaranski et al. | |
| 7,323,025 B2 | | 1/2008 | Weidner | |
| 7,326,355 B2 | | 2/2008 | Graetz et al. | |
| 7,513,822 B2 | * | 4/2009 | Flitsch | H01L 21/67017 454/187 |
| 7,527,664 B2 | | 5/2009 | Jackson | |
| 7,586,420 B2 | | 9/2009 | Fischer et al. | |
| 7,644,970 B2 | | 1/2010 | Chui et al. | |
| 7,724,513 B2 | | 5/2010 | Coglitore et al. | |
| 7,724,518 B1 | | 5/2010 | Carlson et al. | |
| 7,779,586 B2 | | 8/2010 | Stewart et al. | |
| 7,827,738 B2 | | 11/2010 | Abrams et al. | |
| 7,861,102 B1 | | 12/2010 | Ranganathan et al. | |
| 7,934,124 B2 | | 4/2011 | Bechtolsheim et al. | |
| 7,985,382 B1 | * | 7/2011 | Henry | B01L 9/54 422/28 |
| 8,004,831 B1 | | 8/2011 | Carlson et al. | |
| 8,065,560 B1 | | 11/2011 | Patil | |
| 8,097,451 B2 | * | 1/2012 | Gaalswyk | C12M 21/12 202/83 |
| 8,239,340 B2 | | 8/2012 | Hanson | |
| 8,322,086 B2 | | 12/2012 | Weber | |
| 8,479,038 B1 | | 7/2013 | Patil | |
| 9,187,894 B2 | | 11/2015 | Zadok et al. | |
| 9,505,514 B2 | * | 11/2016 | Overley | B65B 25/146 |
| 9,708,827 B1 | * | 7/2017 | Gill | E04H 5/02 |
| 2002/0174888 A1 | | 11/2002 | Brown | |
| 2003/0045226 A1 | | 3/2003 | Yokoyama et al. | |
| 2004/0194484 A1 | * | 10/2004 | Zou | F24F 3/0442 62/186 |

(56) References Cited

U.S. PATENT DOCUMENTS

| | | | |
|---|---|---|---|
| 2004/0255449 A1* | 12/2004 | Koren | B23P 21/004 29/430 |
| 2005/0082445 A1* | 4/2005 | Groves | B66C 23/48 248/188.2 |
| 2005/0124010 A1 | 6/2005 | Short et al. | |
| 2005/0154494 A1* | 7/2005 | Ahmed | G05B 15/02 700/275 |
| 2005/0193643 A1* | 9/2005 | Pettus | B01L 99/00 52/79.1 |
| 2005/0226794 A1* | 10/2005 | Hodge | G05B 15/02 422/243 |
| 2005/0279035 A1* | 12/2005 | Donovan | E04B 1/348 52/79.1 |
| 2006/0107635 A1* | 5/2006 | Homan | A61G 10/023 55/385.2 |
| 2006/0217056 A1* | 9/2006 | Gomi | F24F 3/1603 454/187 |
| 2007/0039260 A1 | 2/2007 | Haddad | |
| 2007/0089854 A1 | 4/2007 | Jaisinghani | |
| 2007/0130844 A1 | 6/2007 | Arts et al. | |
| 2007/0132262 A1* | 6/2007 | Chui Peng Sun | A61G 3/001 296/24.38 |
| 2007/0167126 A1 | 7/2007 | Ghattas | |
| 2007/0228692 A1* | 10/2007 | Kern | A61G 3/001 280/403 |
| 2007/0253831 A1 | 11/2007 | Lee | |
| 2008/0005976 A1* | 1/2008 | Montaigne | E04H 9/14 52/79.1 |
| 2008/0029447 A1 | 2/2008 | Gaalswyk | |
| 2008/0047207 A1 | 2/2008 | Lam | |
| 2008/0201008 A1* | 8/2008 | Twelves | B23P 21/004 700/160 |
| 2008/0261220 A1* | 10/2008 | Cracauer | C12P 19/34 435/6.11 |
| 2009/0249708 A1* | 10/2009 | Zschornack | B64F 1/368 52/79.9 |
| 2009/0305626 A1 | 12/2009 | Hope | |
| 2010/0024315 A1 | 2/2010 | Pope | |
| 2010/0024316 A1 | 2/2010 | Pope | |
| 2010/0024317 A1 | 2/2010 | Pope | |
| 2010/0024322 A1 | 2/2010 | Pope | |
| 2010/0024330 A1* | 2/2010 | Sodaro | E04H 3/02 52/234 |
| 2010/0024352 A1* | 2/2010 | Pope | E04B 1/3431 52/745.02 |
| 2010/0112677 A1 | 5/2010 | Onishi et al. | |
| 2010/0112926 A1* | 5/2010 | Ozeki | F24F 3/161 454/187 |
| 2010/0192493 A1 | 8/2010 | Nakai | |
| 2010/0304658 A1 | 12/2010 | Grcevic | |
| 2011/0053486 A1* | 3/2011 | Holtz | C12M 37/00 454/187 |
| 2011/0214586 A1* | 9/2011 | Wessel | B25J 5/00 104/23.2 |
| 2011/0217917 A1 | 9/2011 | Sulva | |
| 2011/0219953 A1* | 9/2011 | Schreiber | B01D 46/0005 95/273 |
| 2011/0258837 A1* | 10/2011 | Scannon | G05B 19/4188 29/592 |
| 2012/0077429 A1* | 3/2012 | Wernimont | F24F 3/161 454/187 |
| 2012/0181869 A1* | 7/2012 | Chapel | H02J 9/06 307/64 |
| 2014/0179216 A1 | 6/2014 | Walters | |
| 2015/0011153 A1* | 1/2015 | Oswald | F24F 3/161 454/187 |
| 2016/0010884 A1 | 1/2016 | Holtz et al. | |

FOREIGN PATENT DOCUMENTS

| | | |
|---|---|---|
| CN | 101135198 A | 3/2008 |
| CN | 201080493 Y | 7/2008 |
| DE | 4207699 A1 | 9/1993 |
| DE | 4222646 A1 | 1/1994 |
| EP | 398079 A1 | 11/1990 |
| EP | 1 471 138 A1 | 10/2004 |
| FR | 2636362 A1 | 3/1990 |
| JP | 63201441 | 8/1988 |
| JP | 2133737 | 5/1990 |
| JP | 02209526 | 8/1990 |
| JP | 5106887 | 4/1993 |
| JP | 10-077711 A | 3/1998 |
| JP | 11166269 | 6/1999 |
| JP | 2001-141274 A | 5/2001 |
| JP | 2002-164408 A | 6/2002 |
| KR | 10-0675682 | 2/2007 |
| WO | WO-92/03628 A1 | 3/1992 |
| WO | WO-00/02675 A1 | 1/2000 |
| WO | WO-03/095765 A1 | 11/2003 |
| WO | WO-2005/076093 A1 | 8/2005 |
| WO | WO-2007/067656 A2 | 6/2007 |

OTHER PUBLICATIONS

G-CON LLC News Release, Texas-Based Consortium Announces Project GreenVax: A Groundbreaking Vaccine Manufacturing Research Program, dated Feb. 24, 2010.
International Search Report and Written Opinion for Application No. PCT/US2009/069204, dated Mar. 15, 2011.
International Search Report and Written Opinion for International application No. PCT/US2010/045599, dated Feb. 8, 2011.
Langer, "Advances in Large-Scale Biopharmaceutical Manufacturing and Scale-Up Production, Second Edition," BioPlan Associates, Inc. (Nov. 2007).
Singapore Search Report for Application No. 201104579-6 dated Sep. 14, 2012.
Singapore Written Opinion for Application No. 20104579-6 dated Sep. 14, 2012.
Two Images retrieved from National Center for Therapeutics Manufacturing webste, and retrieved from http://www.tamus.edu/iit/nctm on Oct. 19, 2011.
Website: National Center for Therapeutics Manufacturing, copyright 2010, screenshot retrieved from http://www.tamus.edu./iit/nctm/ on Oct. 19, 2011.
Yigit, et al., "Optimal Selection of Module Instances for Modular Products in Reconfigurable Manufacturing Systems," Int. J. Prod. Res., 2003, vol. 41, No. 17, pp. 4063-4074.
Israeli Office Action for Application No. 213669 dated Dec. 24, 2012.
Office Action, Mexican patent application No. MX/a/2011/006850, dated Apr. 4, 2013 [Spanish only].
Search and Examination Report, Singapore Patent Application No. 201104579-6, dated Aug. 2, 2013.
Office Action, Japanese patent application No. 2011-543640, dated Nov. 12, 2013 [in Japanese with English translation].
First Office Action, Chinese patent application No. 200980152450.X, dated Aug. 14, 2013.
Office Action, Mexican patent application No. MX/a/2011/006850, dated Oct. 31, 2013 [Spanish only].
Non-Final Office Action, United States Patent and Trademark Office, U.S. Appl. No. 12/856,888, dated Jun. 4, 2014.
Non-Final Office Action from U.S. Appl. No. 12/856,888 dated Apr. 6, 2015.
Final Office Action from U.S. Appl. No. 12/856,888 dated Oct. 22, 2015.
Non-Final Office Action received in U.S. Appl. No. 12/856,888 dated Feb. 29, 2016.
Hovair Systems, Pneumatic Powered Load Moving Systems—Air Bearing Principle, https://web.archive.org/web/20080521025052/http://www.hovair.com/air-bearing-info/features-and-benefits.htm, May 21, 2008.
Final Office Action received in U.S. Appl. No. 12/856,888 dated Oct. 2, 2014.

(56) References Cited

OTHER PUBLICATIONS

Final Office Action received in U.S. Appl. No. 12/856,888 dated Jun. 15, 2016.

* cited by examiner

FLEXIBLE MANUFACTURING SYSTEM

CROSS-REFERENCE TO RELATED APPLICATIONS

This is a continuation of U.S. patent application Ser. No. 13/129,073, which is the U.S. National Phase of International Patent Application No. PCT/US2009/069204, filed Dec. 22, 2009, and which claims priority to U.S. Provisional Patent Application No. 61/140,339, filed Dec. 23, 2008, and U.S. Provisional Patent Application No. 61/227,658, filed Jul. 22, 2009, the entire contents of each of which is hereby incorporated herein by reference.

FIELD OF THE INVENTION

The invention relates to a flexible, multi-product, multi-technology, expandable facility for manufacturing products, such as biologicals, pharmaceuticals or chemicals, and manufacturing processes using elements of such a facility.

BACKGROUND

Conventional manufacturing facilities for the production of biologicals, pharmaceuticals and chemicals (e.g., drugs) are typically designed for a specific type of product and utilize fixed production components and systems. Generally, different types of technologies or products, e.g. mammalian cell production of proteins, versus mammalian cell propagation of viruses, versus bacterial protein production, require construction of entirely different manufacturing facilities or manufacturing suites within a manufacturing facility. Significant amounts of time generally are required to construct, reconfigure or upgrade a manufacturing facility, as well as to complete a changeover process (e.g., cleaning) between manufacturing campaigns of similar or different products. Some manufacturing facilities may house multiple manufacturing suites to allow parallel manufacturing campaigns, but limitations remain in this configuration, such as for example, the time required to convert or modify a particular manufacturing suite for use in manufacturing a different product (e.g., different technologies or types of products), as well as to complete a changeover process (e.g., cleaning) between manufacturing campaigns of similar or different products. In addition, the potential for cross-contamination between different types of technology or products may limit the ability to house parallel production systems within the same facility.

SUMMARY OF THE DISCLOSURE

The invention provides a manufacturing system comprising (a) a core that is adapted to supply utilities for multiple manufacturing processes and preferably is capable of high capacity supply, (b) and at least two, three, four, five, six, seven, eight, nine, ten or more movable manufacturing bays adapted to be removably coupled to the core and adapted for receiving the utilities supplied from the core. In some embodiments, within the workspace defined by each bay, there is a facility for performing one or more manufacturing processes, or portions or steps of manufacturing processes, which can optionally be performed in parallel. The facility may comprise a plurality of components, each of which performs one or more portions or steps of a chemical, a biological, a pharmaceutical, or some other manufacturing process. The manufacturing system optionally includes a plurality of clean connect areas positioned adjacent to the manufacturing bays when connected to the core for controlling access to the manufacturing bays and/or providing a clean area for making the utility connections between the core and the manufacturing bays. The manufacturing system further optionally includes a plurality of upper docking collars positioned above the bays when connected to the core for supplying one or more utilities to the bays (e.g., under the force of gravity). The manufacturing system optionally comprises one, two, or more holding areas where a movable bay can be cleaned, and where optionally the configuration of components that perform the manufacturing process, or portions or steps of manufacturing processes, can be reconfigured. The manufacturing system optionally comprises a drain, adapted to be removably connected to the one or more movable manufacturing bays, for discharging waste generated during a manufacturing process. The drain for discharging waste is preferably isolated from the core, so as to avoid contamination of the core.

The invention also provides methods of manufacturing products that utilize one or more of the components of such a manufacturing system. The systems and methods of the invention provide a number of benefits, including flexibility and the ability to reduce the time and cost of reconfiguring manufacturing from one technology and/or product to a different technology and/or product (e.g., bacterial host cells, yeast/fungal host cells, insect host cells, mammalian host cells producing protein, mammalian host cells producing virus, plant cells or algae), and/or upgrading to newer, more efficient technology, and/or changing production capacity (increasing or decreasing production) or batch size (e.g., 100 L to 2750 L, 5,000 L to 20,000 L or vice versa), and/or decreasing the changeover time from a first batch production run to a second batch production run, which may be of the same or a different type of production run as the first production run, and/or changing from manufacturing suitable for pre-clinical purposes (GLP, or Good Laboratory Practice) to manufacturing suitable for FDA or other government regulatory agency approved therapeutics (GMP, or Good Manufacturing Practice), or vice versa.

In addition, the systems and methods of the invention provide the advantage of efficiently operating the manufacturing system at full capacity with all available manufacturing bays operating. For example, manufacturing processes utilizing different technologies can each be performed in parallel, and/or GLP and GMP manufacturing can be performed in parallel, and/or small scale (e.g., teaching or pilot scale) and large scale manufacturing can be performed in parallel, e.g. by operating multiple manufacturing bays that have different configurations. The systems and methods offer the additional benefit of permitting ready expansion from low production capacity to higher production capacity by adding more similar or identical bays. Down time is minimized, particularly by utilizing the holding area to prepare manufacturing bays, because production can be switched from one product to another almost immediately by disconnecting one bay from the core and reconnecting a second bay to the core. For example, the manufacturing system can manufacture one product for a period of time (e.g., 1, 2, 3 weeks, 1, 2, 3, 4, 5, 6, 7, 8, 9, 10, 11 or 12 months), and a second product for the next period of time (e.g., 1, 2, 3 weeks, 1, 2, 3, 4, 5, 6, 7, 8, 9, 10, 11 or 12 months), and a third product for the third period of time. As one example, the manufacturing system can manufacture one product for one month, and a second product for the next month. As another example, the manufacturing system can manufacture one product for two months, a second product for the next month, and a third product for the next two months, and so on in any combination of time periods and products. Alternatively, the first, second and third products can be manufactured simultaneously. Alternatively or in addition, the manufacturing system may be used for the manufacturing of a batch of a first product in a first bay, followed by disconnecting the first bay from the core and connecting a second bay to the core, wherein the second bay may be used for the manufacturing of a batch of the first product or a second product. The second bay then may be disconnected from the core and a third bay or the first bay connected for the manufacturing of a batch of the first product, the second product or a third product. Batch manufacturing may be repeated in this manner for any desired period of time and/or combination of products. Similarly, the same configurations and methods apply where the first, second, third or more manufacturing processes referenced herein are portions or steps of an overall manufacturing process to produce a final product or intermediate product (e.g. where the first product, second product or third product are intermediate products, or intermediate stages of manufacture, produced en route to the final pharmaceutical product). In such embodiments, the intermediate products may be readily transferred from a first bay to a second bay, e.g. via a transfer panel (e.g., transfer conduit, transfer junction, transfer cabinet, transfer chamber, etc.) or corridor (e.g., controlled corridor). This ability to switch quickly from one product to another, to manufacture multiple products simultaneously, or to repeatedly manufacture the same products at a faster rate allows manufacturers to keep up with product demand and also permits the novel concept of just-in-time manufacturing for therapeutics.

The manufacturing system and methods of the invention offer the added advantage of providing secure and controlled employee access to multiple distinct and potentially proprietary technologies. In a single manufacturing system, each manufacturing bay can have a separate access and separate security system, such that different companies could own or otherwise arrange for use of (e.g., lease) different bays and permit only their authorized employees to access the company's proprietary technologies. In some embodiments, the core and at least one manufacturing bay have different personnel with no cross contact.

DETAILED DESCRIPTION

Figure 1:
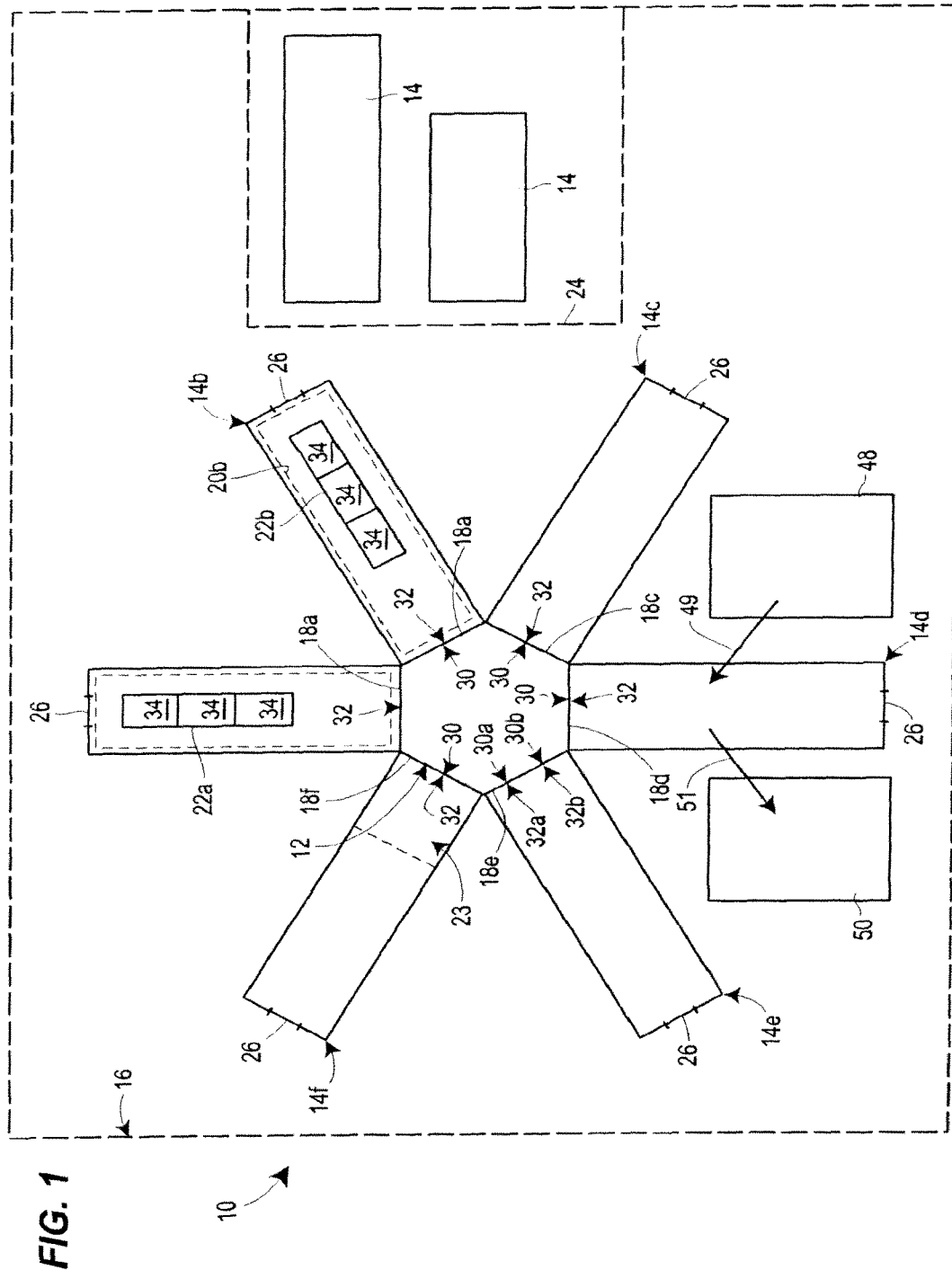
FIG. 1 is a plan view of one embodiment of a manufacturing system of the invention.
Figure 2:
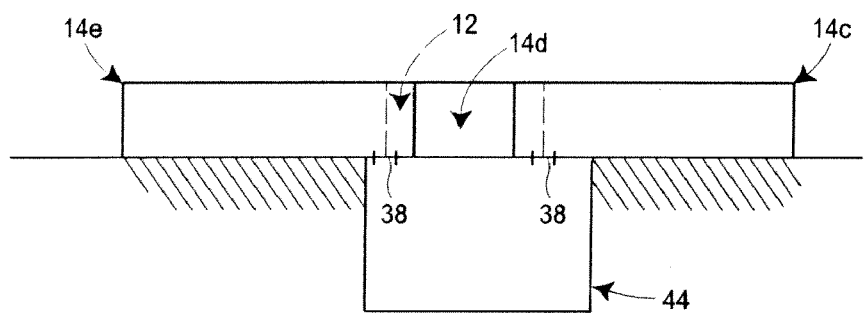
FIG. 2 is a side view of the manufacturing system of FIG. 1 including an optional drain and waste receptacle.

With reference to FIGS. 1 and 2, some embodiments of the manufacturing system 10 of the present disclosure comprise a core 12 and a plurality of movable manufacturing bays 14 disposed within an optional housing 16, as will be described in further detail below. In the embodiment depicted in FIG. 1, the system 10 includes first through sixth movable manufacturing bays 14a-14f. The bays 14 can be constructed of generally any material and are generally box-shaped in the currently disclosed embodiment. Other shapes are also intended to be within the scope of the invention. The bays may be of a variety of sizes suitable for the intended manufacturing use, provided the bays are of sufficient size and configuration to permit one or more personnel to occupy the bay in order to perform a manufacturing process, or portions or steps of manufacturing processes, and provided the bays are of a size that is movable, such as for example, by one or more means of movement as provided herein. The term "bay" used throughout the present disclosure is merely an exemplary term, and meant to include generally any free-standing structure that is disposed outside of (e.g., separate from) the core 12, movable relative to the core 12, and defining an enclosed or partly enclosed space for performing a task or a group of tasks. Preferably, a bay is of appropriate size and configuration for one or more personnel to enter and perform a task or a group of tasks (e.g., manufacturing processes, portion or steps of a manufacturing process). As such, persons having ordinary skill in the art would understand that similar structures can alternatively be referred to as modules, suites, trailers, mobile units, pods, buildings, etc., or generally any other term that can be used to describe a movable structure defining an enclosed workspace as described herein.

The core 12, which can optionally comprise a "clean core," supplies two or more, or three or more, utilities, for example, to the manufacturing bays 14, wherein at least two or three of the two or more or three or more utilities are selected from the group consisting of (a) clean air, (b) clean water, (c) electricity, (d) oxygen, and (e) carbon dioxide. In an alternative embodiment, the three or more utilities can be selected from the group consisting of (a) air, (b) water, (c) electricity, (d) oxygen, and (e) carbon dioxide. In another alternative embodiment, the three or more utilities can be selected from the group consisting of (a) clean air, (b) sterile water, (c) electricity, (d) oxygen, and (e) carbon dioxide. In yet another embodiment, the three or more utilities can be selected from the group consisting of (a) air, (b) sterile water, (c) electricity, (d) oxygen, and (e) carbon dioxide. The term "core" used throughout the present disclosure includes any free-standing building, portion of a building or other structure disposed entirely separate from the bays 14 such that the core 12 can be sealed from the bays 14 and the bays 14 can be sealed from the core 12. Moreover, the position or location of the "core" relative to the bays 14 is not limited to any of the positions or locations described herein, but rather, can include any building, portion of a building, or structure positioned relative to any of the other system components including the bays 14. As such, the term "core" is not limited to being located in the center of the system or in any other location. Moreover, as mentioned above, the bays 14 are disposed outside of the core 12, and therefore, the core 12 does not accommodate, surround, or otherwise contain the bays 14.

"Clean water," as used herein, can include, for example, filtered water, de-ionized water, sterile water, distilled water, purified water (e.g., USP purified water, EP purified water), water for injection (e.g., USP WFI, EP WFI), USP sterile water for injection, USP sterile water for inhalation, USP bacteriostatic water for injection, USP sterile water for irrigation, or highly purified water (e.g., EP HPW). The USP designation means that the water is the subject of an official monograph in the current US PHARMACOPEIA with various specifications for each type. Similarly, the EP designation means that the water is the subject of standards of the European Pharmacopoeia for water quality in drug manufacturing processes.

"Clean air," as used herein, can be defined by one of two standards used to test and categorize the class of air. These two standards include the United States Federal Standard 209E and the International Standard ISO 14644-1. Both standards define terms, identify procedures for collecting and testing the air, and provide the statistical analysis required to interpret the data. Federal Standard 209E classifications of air include Class 1, Class 10, Class 100, Class 1,000, Class 10,000, and Class 100,000. The class number (e.g., 100) is the maximum allowable number of particles 0.5 microns and larger per cubic foot of air; the lower the number, the cleaner the air. The ISO classifications are rated as ISO Class 1, ISO Class 2, ISO Class 3, etc. through ISO Class 9. Class 1 under both standards indicates the cleanest, ultrapure air. The ISO Class 2 correlates most closely to Federal Standard Class 100. Therefore, in accordance with the present application, "clean air" can include, for example, any air classified in the range of classes from class 100 to class 100,000 under US Federal Standard 209E and, in one embodiment, in the range of classes from class 10,000 to class 100,000 under US Federal Standard 209E.

Further utilities that can be supplied from the core 12 include, for example, (a) clean air, (b) atmospheric air, (c) sterile water, (d) non-sterile water; (e) electricity, (f) a liquid coolant; (g) oxygen, (h) carbon dioxide, (i) nitrogen, (j) argon, (k) helium, (l) purified water (e.g., USP PWS, USP WFI), (m) steam, (n) clean air (e.g., filtered air), (o) communications (e.g., telephone, data, local area network), (p) non-potable water, (q) potable (i.e., drinkable) water, (r) tap water, (s) well water, and (t) a liquid solution useful in a manufacturing process (e.g., a nutritional media, a dilution buffer, and/or a purification media).

In one embodiment, the core 12 can be a stand-alone structure built in a fixed location. In other embodiments, the core 12 may be a stand-alone structure that itself is movable on wheels, rails, tracks, by lifting and placement (e.g., by a crane, a crane on overhead rails, etc.), airlift, hovercraft, or other air cushion, or by other means known in the art. In some embodiments, at least some of the utilities can be stored within the core 12 itself. For example, utilities in gas or liquid form can be contained within reservoirs, tanks, or other containers housed within the core 12, and electricity could foreseeably be supplied from a generator stored within the core. In some embodiments, the core 12 may require connection to one or more incoming utilities such as water, electricity, one or more gases, a computer network line, an internet line, etc.

The core 12 depicted in FIG. 1 includes a hexagonal architecture defining six (6) distinct dock positions 18a-18f. Each dock position 18a-18f is adapted to be removably coupled to a movable manufacturing bay 14, as depicted. As such, in the disclosed embodiment, the core 12 and the movable manufacturing bays 14 are arranged in a hub and spoke configuration with the movable manufacturing bays 14 circumferentially spaced around the core 12. A linear arrangement is equally suitable, as will be described below with reference to FIGS. 4, 5, and 7, for example, and one of ordinary skill in the art can envision a number of suitable configurations for the core 12 and manufacturing bays 14. That is, the core 12 and bays 14 are not limited to the architecture and configuration depicted in the attached FIGS. 1-7, but rather, may include generally any architecture and configuration. For example, the core 12 may include a square, a rectangular, or an octagonal architecture, or generally any other shape capable of serving the intended purpose.

The movable manufacturing bays 14 of FIG. 1 are each removably coupled to the core 12 and receive the utilities. In one embodiment, the bays 14 may be removably coupled to the core 12 via one or more threaded couplings, one or more quick-connect couplings, one or more quick-disconnect couplings, one or more male/female connectors, one or more sanitary couplings, one or more sanitary fluid connectors, one or more steam-in-place connectors, one or more air duct connectors, and/or any other foreseeable mechanism capable of serving the intended purpose. In one embodiment, the bays 14 do not actually physically removably connect to the core 12 (e.g., direct contact between the exterior of the bays and exterior of the core), but rather, just to the fittings or other devices that deliver the utilities. Such an embodiment includes, for example, bays that are in close proximity (e.g., adjacent) to the core, or a distance from the core (e.g., a different area within the same housing) and still falls within the means of being "coupled" to the core 12, as used herein. In other embodiments, the bays 14 can also be fixedly and rigidly connected to the core 12. Such a configuration can advantageously help control and/or limit the motion of the bays 14 relative to the core 12. For example, because the bays 14 are movable, it is foreseeable that they may be equipped with a suspension system, for example, to facilitate their maneuverability. Such suspension systems could include springs and/or other dampeners that would enable the bays 14 to move up and down, and rock side to side, for example, in response to loading or movement over uneven terrain. However, some manufacturing processes and/or components for performing manufacturing processes may be sensitive to such movements. Therefore, rigidly fixing the bays 14 to the core 12 can prevent such movement and ensure proper process and component performance. In one embodiment, the bays 14 can be fixed to the core 12 with fixation devices such as threaded fasteners, tongue and groove mechanisms, cam-locks, manual latch/locking systems, locking/coupling systems, and/or any other coupling devices or fixation devices. In some embodiments, such fixation devices could be contained within a skirt system, for example, to maintain cleanliness. In other embodiments, the core 12 and/or the bays 14 could foreseeably be equipped with one or more jack-type mechanisms for raising the bays 14 off of the floor to prevent motion due to the suspension system. This configuration may be particularly advantageous when the bays are not fixedly and rigidly connected to the core. The one or more jacks may be hydraulic, pneumatic, mechanical, electro-mechanical, or any other known type. The jack-type system could be used instead of rigidly fixing the bays 14 to the core 12, or in addition thereto. The jack-type systems could also be used to level the bays 14. The bays 14 could include other leveling devices, which could foreseeably include automatic leveling devices. Moreover, the bays 14 could be equipped with braking mechanisms that prevent the bays 14 from moving away from the core 12 when activated.

Still referring to FIG. 1, each bay 14 defines a workspace 20 accommodating a facility 22 for performing a manufacturing process. As will be understood from the complete description set forth herein, the term "facility" is intended to include any and everything that can be accommodated within the bays 14, but for the actual operating personnel. For example, the term "facility" can include space within the bays 14, whether divided from (e.g., separated by walls or other barriers) or continuous with the remainder of the space within the bay 14. In addition, the term "facility" can include empty space within the bays 14 or one or more pieces of equipment for performing any one or more of the processes or portions of processes described herein. Moreover, the term "facility" can include equipment that is generally unrelated to performing any of the processes or portions of processes described herein such as ambient lighting equipment, coat hangers, lockers, cabinetry, etc. The workspace 20 is defined as the interior portion of the bay 14, within which a manufacturing process or portions or steps of the process is/are carried out.

More specifically, the first bay 14a accommodates a first facility 22a for performing a first manufacturing process, the second bay 14b accommodates a second facility 22b for performing a second manufacturing process, and so on. This configuration advantageously enables the various facilities 22 to perform multiple overall manufacturing processes, or portions or steps of the same overall manufacturing process, in parallel, or in series. For the sake of clarity, only the first and second movable manufacturing bays 14a, 14b are depicted as including facilities 22a, 22b, but it should be understood that each of the remaining bays 14c-14f also include respective facilities. The workspace 20 of each bay 14 is isolated from the workspaces 20 of the other bays 14. The workspaces are preferably isolated so as to avoid contaminating the respective manufacturing processes with raw materials, reagents or cells used in (and wastes from) the other manufacturing processes, and vice versa. The isolation may be achieved by ensuring there are no conduits, air ducts, fluid lines, etc. shared between bays. Moreover, isolation can be ensured by providing appropriately sealed entry and exit points such as doors, for example. In one embodiment illustrated with respect to the third manufacturing bay 14d in FIG. 1, the bays 14 can be equipped with one way entry rooms 48 and one way exit rooms 50. The entry rooms 48 can be clean rooms removably and directly connected to an entry of the bay 14 via a movable corridor 49. The entry rooms 48 can be for manufacturing personnel to don a clean suit or other manufacturing attire, for example, prior to entering the bay 14. The exit rooms 50 can be removably and directly connected to the bays 14 via a movable exit corridor 51. The exit rooms 50 can be for manufacturing personnel to exit the bay 14 into and change back into their street clothes, for example. In some alternative embodiments, one way entry and/or exit rooms may be contained within the bay 14, or may be attached to (e.g., adjacent to, exterior to) the core 12, as will be described below with reference to the various embodiments depicted in FIGS. 4-6.

The manufacturing bays 14 may be of different sizes and shapes based on capacity and/or technology. As mentioned, the bays 14 are adapted to be removably connected to the core 12, and to be movable. Mobility can be accomplished via rails, wheels, tracks, lifting and placement (e.g., by a crane, a crane on an overhead rail system, etc.), airlift, hovercraft or other air cushion, or by other means known in the art. In some embodiments, the bays 14 could be self-propelled or towed. The bays 14 optionally comprise sealable access points 26, optionally with one-way access of materials and personnel, that permit employees and raw materials or manufactured product to enter and exit the bays 14, optionally with decontamination areas. Each bay may also be designed for viewing by visitors, and as such could be equipped with windows or transparent walls.

In any of the foregoing embodiments, optionally the movable manufacturing bays 14 are not connected to each other. In some embodiments, the movable manufacturing bays 14 are sealed from the core 12, except for the supply of the three [two?] or more utilities. Preferably, as depicted in FIG. 1, the core 12 has one or more sealable outlets 30 for supplying utilities to each of the respective manufacturing bays 14. Accordingly, each bay 14 has at least one sealable inlet 32 for receiving the utilities from the core 12. Preferably, the core 12 is sealed from receiving incoming material from the movable manufacturing bays 14. This one-way communication can be achieved by using a one-way valve, for example, disposed at the outlets 30 or any other means known in the art.

As depicted with reference to the fifth manufacturing bay 14e in FIG. 1, some embodiments of the manufacturing system may comprise first and second outlets 30a, 30b associated with the core 12 for each bay 14. Each of the first and second outlets 30a, 30b discharge, or are adapted to discharge, at least one of the utilities. This embodiment therefore requires at least one first inlet 32a and one second inlet 32b associated with the movable manufacturing bay 14e. The at least one first inlet 32a is removably coupled, or adapted to be removably coupled, to the first outlet 30a of the core 12. Similarly, the at least one second inlet 32b is removably coupled, or adapted to be removably coupled, to the second outlet 30b of the core 12. In additional embodiments, each of the first and second outlets 30a, 30b of the core 12 can comprise a plurality of outlets, each of the plurality of outlets supplying, or adapted to supply, a distinct utility of the three or more utilities. In such embodiments, the first inlet 32a of each movable manufacturing bay 14 comprises a plurality of inlets removably coupled, or adapted to be removably coupled, to the plurality of outlets of the first outlet 30a of the core 12, each of the plurality of inlets of the first inlet receiving, or adapted to receive, a distinct utility from one of the plurality of outlets of the first outlet. Correspondingly, the second inlet 32b of each movable manufacturing bay 14 comprises a plurality of inlets removably coupled, or adapted to be removably coupled, to the plurality of outlets of the second outlet 30b of the core 12, each of the plurality of inlets of the second inlet receiving, or adapted to receive, a distinct utility from one of the plurality of outlets of the second outlet 30b.

Examples of utilities supplied from the core 12 include clean air, untreated air, sterile water, purified water (WFI or water for injection), untreated water (for cooling or other uses not requiring sterility), specialty gases, e.g. oxygen, carbon dioxide, nitrogen, argon, helium, electricity, liquid coolant, steam, communications (e.g., telephone, data) and/or heat. Moreover, in some embodiments, the core 12 can accommodate one or more HVAC systems for different air handling modes (e.g., Class 100-100,000), computers for monitoring, monitoring equipment, generators, backup generators, and optionally a duplicate system for supplying such utilities to ensure no loss of productivity if a breakdown occurs. A duplicate system also allows an increase capacity if needed.

In some embodiments, each individual bay 14 can be equipped with its own HVAC air-handling unit, instead of or in addition to, a central HVAC air-handling unit stationed in the core 12. Such individual HVAC units could be 2 or 3 phase units, operating at 220 or 230 volts, for example, and sized depending the dimensions of the bays 14. In such an embodiment, the individual HVAC units could easily be serviced when the bays 14 are disconnected from the core 12 without interrupting the manufacturing process or processes being conducted in the other bays 14. Furthermore, in some embodiments, each bay 14 could be equipped with its own backup electrical generator for use under circumstances where the main electricity supplied from the core 12 is interrupted. In other embodiments, all of the utilities, but for a primary source of water and electricity can be maintained on each of the bays 14 themselves within utility rooms 23, for example, only one of which is depicted with reference to the fifth bay 14e in FIG. 1. Such utility rooms 23 can be sealed from the respective workspaces 20 of the bays 14, while the water and electricity can be supplied to the bays 14 in any of the manners described herein.

In some embodiments, the first, second or more facilities 22 respectively comprise a plurality of components 34 (shown in the first and second manufacturing bays 14a, 14b in FIG. 1). Each of the components 34 performs one or more steps of a chemical, a biological, or a pharmaceutical manufacturing process. Embodiments of manufacturing processes, or portions or steps of manufacturing processes, that the one or more components 34 can perform include but are not limited to one or preferably 2, 3, 4, 5, 6, 7, 8, 9, 10, 11, 12, 13, 14, 15, 16 or more of the following:

cell inoculum preparation;
culturing or fermentation of mammalian cells such as Chinese hamster ovary (CHO) cells, mouse myeloma cell lines, human embryonic kidney, human retinal cells, NSO, HEK293, PER.C6, or cells suitable for replicating viruses, such as African green monkey VERO, MDCK (canine kidney cells), CEF (chicken embryonic fibroblasts), 2BS, Mark145, ST1, DF-1, CIK, EPC;
incubation of chicken eggs for vaccine production;
culturing or fermentation of bacterial or prokaryotic cells, including but not limited to gram-negative or gram-positive organisms, Enterobacteriaceae such as *E. coli*, e.g. *E. coli* K12 strain, *E. coli* X1776 strain, *E. coli* W3110 strain, and *E. coli* K5, *Enterobacter, Pseudomonas* such as *P. fluorescens* and *P. aeruginosa, Erwinia, Klebsiella, Proteus, Salmonella*, e.g., *Salmonella typhimurium, Serratia*, e.g., *Serratia marcescans*, and *Shigella*, as well as *Bacilli* such as *B. subtilis* and *B. licheniformis*, or *Streptomyces*;
culturing fermentation of yeast or fungal cells, including but not limited to *Saccharomyces*, e.g. *S. cerevisiae, Schizosaccharomyces pombe, Kluyveromyces, Pichia*, e.g. *P. pastoris, Candida, Trichoderma, Neurospora*, e.g. *N. crassa, Schwannomyces*, filamentous fungi such as, e.g., *Neurospora, Penicillium, Tolypocladium, neosporidia, Aspergillus*, e.g. *A. nidulans* and *A. niger, Hansenula, Kloeckera, Torulopsis*, or *Rhodotorula*;
culturing insect cells, e.g. baculoviral systems, Sf9 cells;
growing plant cells, including but not limited to algae, tobacco, algae, duckweed, or mushrooms;
inoculating cells or chicken eggs with virus;
harvesting cells or virus or culture medium;
inactivated vaccine production, including but not limited to heat killed pneumococcal or formalin-treated viruses, live vaccine production, including replication of influenza, or other viruses for vaccines, e.g. measles, mumps, rubella, varicella, polio, rabies, H5N1 virus;
viral vector production, including but not limited to adenovirus, AAV, alphavirus, poxvirus, retrovirus, picornavirus, paramyxovirus, rhabdovirus;
counting cells, cell viability measurement, osmolarity measurement, metabolite measurement, lactate dehydrogenase measurement;
lysing cells;
centrifugation processes;
filtration processes;
freezing processes, including freezing of purified bulk product; thawing processes;
purification processes, including but not limited to ion exchange chromatography, affinity chromatography, hydrophobic interaction chromatography, hydrophobic charge induction chromatography, size exclusion chromatography, metal affinity chromatography, protein A chromatography, hydroxyapatite separation, multicolumn countercurrent solvent gradient purification process,
buffer dilution processes, formulation and/or filing processes, including but not limited to adding excipients, sterile filtration, filling processes, freeze-drying, spray-drying, pegylation, sealing, labeling, process control, liquid nitrogen storage;
peptide synthesis and/or purification processes;
siRNA synthesis and/or purification processes;
synthesis and/or purification of small organic molecules.

Where such manufacturing processes are portions of steps of an overall manufacturing processes to produce a final product or intermediate product, the product of such a portion or step is referred to herein as a "stage of manufacture."

Some embodiments of components 34 for carrying out such manufacturing processes, or portions or steps of manufacturing processes, include but are not limited to one or preferably 2, 3, 4, 5, 6, 7, 8, 9, 10, 11, 12, 13, 14, 15, 16 or more of the following: a culturing component, a harvesting component, a purifying component, a biosafety cabinet, one or more culture flasks, an incubator, a carbon dioxide incubator, a cell counter, a cell viability measuring device, an osmolarity measuring device, a metabolite measuring device, a lactate dehydrogenase measuring device, a sealer, sterile connecting devices, a microscope, a water bath, a peristaltic pump, a bioreactor, including single use or disposable bioreactors, a wave bioreactor, a media batch tank, a buffer holding tank, an agitator, a sparger, a light house for plants, a tank for growing algae/duckweed, a room for mushrooms, a pump, a piston pump, a diaphragm pump, a rotary lobe pump, a positive displacement pump, a flow control valve, a centrifuge component, a disk stack centrifuge, a pressure regulator, a surge tank, a cell lysis component, a mechanical disruptor, a shredder and/or extractor and/or vacuum system for separating proteins from plants, algae or mushrooms, a depth filter component, a clarification filter, a holding tank, an ultrafiltration component, a diafiltration component, an ultrafiltration/diafiltration system, a drain line, a heat removal component, a recirculation tank jacket, a heat exchanger, a laminar flow hood, a freezing system, one or more cryovessels, one or more cold baths, one or more liquid nitrogen systems, one or more freeze/thaw components, a spray-dryer, a freeze-dryer, a buffer dilution skid, an ion exchange chromatography column or membrane or skid or bed, an affinity chromatography column or membrane or skid or bed, a hydrophobic interaction chromatography column or membrane or skid or bed, a hydrophobic charge induction chromatography column or membrane or skid or bed, a liquid chromatography column or membrane or skid or bed, a high pressure liquid chromatography column or membrane or skid or bed, a gas chromatography column or membrane or skid or bed (for both separation of organic molecules and for analysis), other separation technologies, a size exclusion chromatography column or membrane or skid or bed, a metal affinity chromatography column or membrane or skid or bed, a protein A chromatography column or membrane or skid or bed, a hydroxyapatite column or membrane or skid or bed, disposable purification systems, process control systems, a filter housing, an ultraviolet analyzer, a conductivity probe, a steam seal, a steam trap, a glasswasher, an autoclave, a sterilizing filter, one or more sterile containers, one or more sterile vials, one or more sterile syringers, a lyophilizer, a fume hood (optionally connected to an outlet in the bay) and related equipment for chemical synthesis, an evaporator for removing solvents (optionally connected to an outlet in the bay), a crystallization system for purifying organics, one or more computer networks for individual bays and for the core facilities, one or more analytical devices for assaying products, electrophoresis equipment (eg, SDS-PAGE), a pH meter, a mass spectrometer, an IR spectrometer, a UV spectrophotometers (for analysis or detection during processing), in-line analytics attached to fermentation and purification systems, disposable fermentation systems from 20 L-5000 L or more using stir (e.g., Xcellerex) or movement (e.g., GE Healthcare Wave), centrifugation equipment for either discontinuous or continuous separation, clean air hoods or containment systems for filling, wiring for or wireless systems for monitoring or automated processes, gas lines for clean air or specialty gases, water lines, pumps for fluid transfer, containers for product collection, freezer and cold room areas, non-aqueous solvent storage systems, control systems and specialty software for automation and apparatus controls.

Other embodiments of components 34 for carrying out such manufacturing processes, or portions or steps of manufacturing processes, include but are not limited to one or preferably 2, 3, 4, 5, 6, 7, 8, 9, 10, 11, 12, 13, 14, 15, 16 or more of the following: a culturing component, a harvesting component, one or more culture flasks, an incubator, a carbon dioxide incubator, a cell counter, a bioreactor, a media batch tank, a cell lysis component, an autoclave, a sterilizing filter, and electrophoresis equipment such as an SDS-PAGE.

Other embodiments of components 34 for carrying out such manufacturing processes, or portions or steps of manufacturing processes, include but are not limited to one or preferably 2, 3, 4, 5, 6, 7, 8, 9, 10, 11, 12, 13, 14, 15, 16 or more of the following: a purifying component, a biosafety cabinet, a sparger, a mechanical disruptor, an ultrafiltration component, a diafiltration component, an ultrafiltration/diafiltration system, a laminar flow hood, one or more cryovessels, an ion exchange chromatography column or membrane or skid or bed, an affinity chromatography column or membrane or skid or bed, a hydrophobic interaction chromatography column or membrane or skid or bed, a hydrophobic charge induction chromatography column or membrane or skid or bed, a size exclusion chromatography column or membrane or skid or bed, a metal affinity chromatography column or membrane or skid or bed, a protein A chromatography column or membrane or skid or bed, a hydroxyapatite column or membrane or skid or bed, a liquid chromatography column or membrane or skid or bed, a high pressure liquid chromatography column or membrane or skid or bed, a gas chromatography column or membrane or skid or bed, a lyophilizer, one or more extractor systems, one or more evaporators each with an outlet in the bay, crystallization systems for purifying organics, one or more in-line analytics attached to fermentation and purification systems, and one or more disposable fermentation systems.

In some embodiments, the components 34 can include a hood for aseptic processing, wherein the hood has one, two, three or all organism counts selected from the group consisting of: (a) viable particulate air organism count of <1 $CFU/m^3$, (b) settling plate organism count of <1 CFU/4 hours, (c) Replicate Organisms Detection and Counting (RODAC) plate organism count of <1 CFU/plate, and (d) touch plate organism count of <1 CFU/plate. In such embodiments, some methods of using the manufacturing system could include maintaining the hood to have one, two, three or all organism counts selected from the group consisting of: (a) viable particulate air organism count of <1 $CFU/m^3$, (b) settling plate organism count of <1 CFU/4 hours, (c) Replicate Organisms Detection and Counting (RODAC) plate organism count of <1 CFU/plate, and (d) touch plate organism count of <1 CFU/plate.

In some embodiments, the components 34 can include a surface (e.g., wall, floor, counter and/or sink) or area, e.g., for aseptic processing, wherein the surface has one, two, three or all organism counts selected from the group consisting of: (a) viable particulate air organism count of ≤10 $CFU/m^3$, (b) settling plate organism count of ≤5 CFU/4 hours, (c) Replicate Organisms Detection and Counting (RODAC) plate organism count of ≤5 CFU/plate, and (d) touch plate organism count of ≤5 CFU/plate. In such embodiments, some methods of using the manufacturing systems could include maintaining the surface to have one, two, three or all organism counts selected from the group consisting of: (a) viable particulate air organism count of ≤10 $CFU/m^3$, (b) settling plate organism count of ≤5 CFU/4 hours, (c) Replicate Organisms Detection and Counting (RODAC) plate organism count of ≤5 CFU/plate, and (d) touch plate organism count of ≤5 CFU/plate.

In still further embodiments, the components 34 can include a surface (e.g., wall, floor, counter and/or sink) or area, e.g., for fermentation and/or purification processes, wherein the surface has one, two, three or all organism counts selected from the group consisting of: (a) viable particulate air organism count of ≤100 $CFU/m^3$, (b) settling plate organism count of ≤50 CFU/4 hours, and (c) Replicate Organisms Detection and Counting (RODAC) plate organism count of ≤25 CFU/plate. In such embodiments, some methods for using the manufacturing system could include maintaining the surface to have one, two, three or all organism counts selected from the group consisting of: (a) viable particulate air organism count of ≤100 $CFU/m^3$, (b) settling plate organism count of ≤50 CFU/4 hours, and (c) Replicate Organisms Detection and Counting (RODAC) plate organism count of ≤25 CFU/plate.

In some embodiments, each movable manufacturing bay 14 comprises a control system for controlling the associated manufacturing process independent of the manufacturing processes carried out in the other bays 14. Such a control system can include a central processor, a memory device, one or more user interfaces, any number of sensors for identifying various process parameters within the bays, and/or any other control system components that may be desirable.

In some embodiments, each of the movable manufacturing bays 14 further comprises a drain 38 (shown in FIG. 2) for discharging waste generated during the associated manufacturing processes. In one embodiment, the waste is discharged into a waste receptacle 44, as shown in FIG. 2. The waste receptacle 44 may include a self-contained waste holding tank, a system of pipes for delivering waste to a sewage system, a central waste treatment and disposal control mechanism, or any other foreseeable construction. In some embodiments, gravity-assisted flow permits the waste from each bay 14 to exit the drain 38 and flow to the waste receptacle 44 that is located below (e.g., one floor below) the bays 14, where the waste can be decontaminated, treated, and/or processed, etc. The drain 38 and waste receptacle 44 are preferably isolated from the core 12, so as to avoid contamination of the core 12. The drain 38 of each of the bays 14 can be equipped with a one-way check valve, a trap, or a similar flow control device to handle condensable gases, for example. In other embodiments, condensers (e.g., surface condensers) can be used to remove emissions, such as volatile organic compound emissions. Moreover, in some embodiments, the drain 38 can include a cap, for example, for sealing the drain 38 when the bay 14 is being transported.

Figure 3:
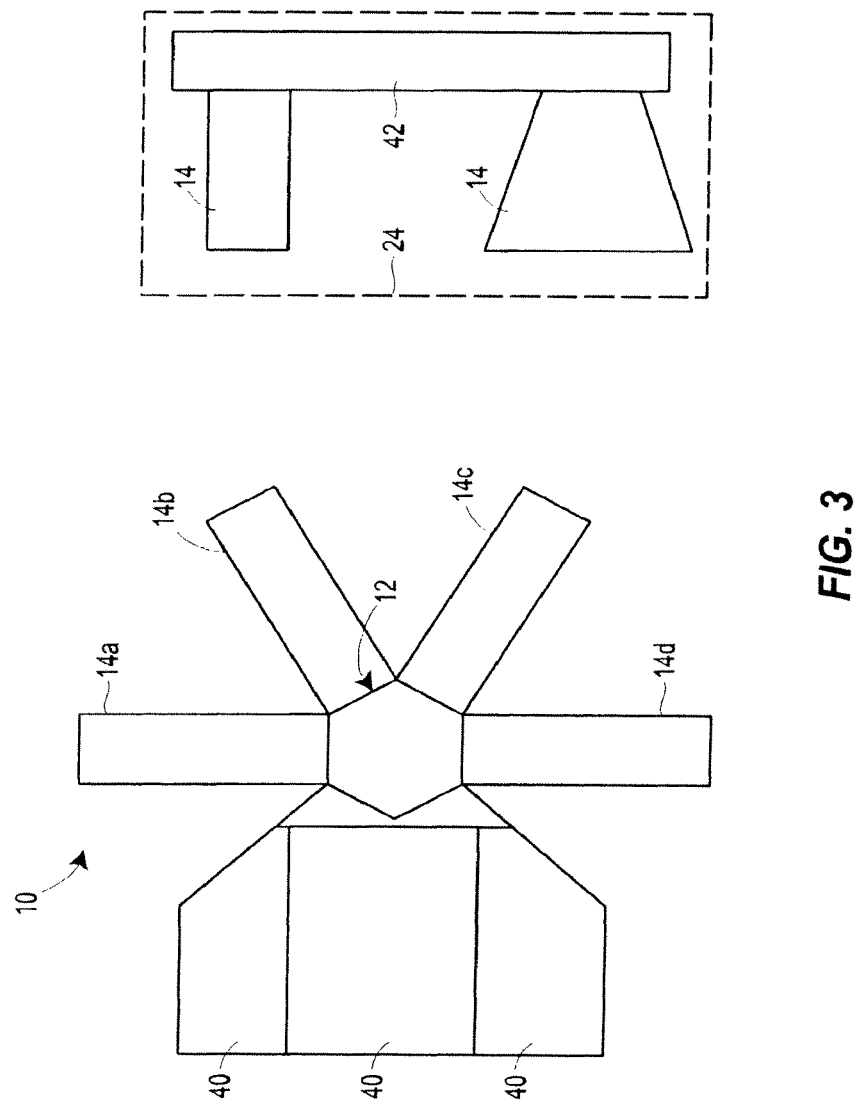
FIG. 3 is a plan view of another embodiment of a manufacturing system of the invention.

As mentioned above, in some embodiments, the manufacturing system 10 also comprises the housing 16. The housing 16 of the embodiment shown in FIG. 1 contains the core 12, the first through sixth movable manufacturing bays 14a-14f that are connected, or connectable, to the core 12, and any additional manufacturing bays 14 that may be later connected to the core 12. In some embodiments, the system also comprises a holding area 24, which may be disposed inside or outside of the optional housing 16. The holding area 24 is preferably disposed away from the core 12 and provides a location where each of the movable manufacturing bays 14 can be positioned to undergo (i) a cleaning operation, whereby the workspaces of the first and second movable manufacturing bays are cleaned, (ii) a change-over operation, whereby the facilities of the first and second movable manufacturing bays are altered, (iii) qualifying, preparation and loading of supplies and specific raw materials (including reagents, cells and/or disposable manufacturing components) for the next manufacturing process, and/or (iv) a servicing operation on any of the facilities 22, utilities, or an HVAC unit associated with the bays 14. For example, as depicted in FIG. 3, one embodiment of the holding area 24 can include a clean area 42, for introducing clean raw materials and/or utilities to one or more bay 14, and/or one or more dirty areas (not depicted), for decontaminating or cleaning a bay. The clean and/or dirty areas may themselves include a walled-off section of the holding area 24 with openings or passages that are adapted to be removable coupled to one or more access points of the bays 14. Such a configuration ensures that no cross-contamination can occur between the dirty area and the clean area.

As depicted in FIG. 3, the manufacturing system 10 can optionally comprise or be disposed adjacent to auxiliary stations 40 such as analytical laboratories that are capable of separately handling multiple sample types, a warehouse including shipping and receiving areas, equipment storage area, a cell bank storage area, large capacity freezers, e.g., 2-8 degrees Centigrade, or −20 degrees Centigrade, or −70 degrees Centigrade, offices or administrative space, conference rooms, auditoriums, process and formulation labs, and/or other research or development laboratories or facilities. In certain embodiments, the manufacturing system may comprise the core, bays, holding area and auxiliary stations within the same housing structure.

In a related aspect, the invention provides methods of using the manufacturing systems 10 to manufacture a plurality of products, preferably in parallel, and preferably using a plurality of distinct technologies. In some embodiments, the invention provides a method of manufacturing a plurality of products that first includes connecting the first movable bay 14a to the core. Then, the method includes performing a first manufacturing process with a first configuration of components 34 disposed within the first movable bay 14a to manufacture a first product. Then, the first movable bay 14a is disconnected from the core 12, and a second configuration of components 34 can be established within the first movable bay 14a. Next, the first movable bay 14a is reconnected to the core 12, and a second manufacturing process is performed with the second configuration of components 34 to manufacture a second product. In some instances, the second manufacturing process is distinct from the first manufacturing process. Moreover, in some instances, the time period required for disconnecting the first movable bay 14a from the core 12, establishing the second configuration of components 34, and reconnecting the first movable bay 34 to the core 12 can be 30 days or less, 28 days or less, 21 days or less, 14 days or less, 10 days or less, 5 days or less, or 4 days or less, or 3 days or less, or 2 days or less, or 1 day or less, for example.

In some embodiments, the method can further include supplying at least one utility to the first movable bay 14a from the core 12 when the first movable bay 14a is connected to the core 12. The at least one utility includes at least one of the utilities, preferably selected from the group consisting of (a) clean air, (b) clean water, (c) oxygen, and (d) carbon dioxide. Other utilities described hereinabove may be supplied, or any other foreseeable utility. In some embodiments, three or more utilities, preferably selected from the group consisting of (a) clean air, (b) sterile water, (c) electricity, (d) oxygen, and (e) carbon dioxide are supplied to the first movable bay 14a from the core 12. Optionally, further utilities may be supplied, including but not limited to any of the utilities described herein.

In some embodiments, connecting the first movable bay 14a to the core 12 includes connecting at least one 32 inlet of the first movable bay 14a to at least one outlet 30 of the core 12, wherein the at least one outlet 30 of the core 12 supplies at least one utility, preferably selected from the group consisting of (a) clean air, (b) clean water, (c) oxygen, and (d) carbon dioxide. In some embodiments, disconnecting the first movable bay 14a from the core 12 comprises disconnecting the at least one inlet 32 of the first movable bay 14a from the at least one outlet 30 of the core 12. In some embodiments, re-connecting the first movable bay 14a to the core 12 comprises re-connecting the at least one inlet 32 of the first movable bay 14a to the at least one outlet 30 of the core 12. In some embodiments, connecting the at least one inlet 32 of the first movable bay 14a to the at least one outlet 30 of the core 12 comprises connecting a plurality of outlets 30 of the core 12 to a plurality of inlets 32 of the first movable bay 14a, wherein each of the plurality of outlets 30 supplies a distinct utility. In some embodiments, disconnecting the at least one inlet 32 of the first movable bay 14a from the at least one outlet 30 of the core 12 comprises disconnecting the plurality of inlets 32 from the plurality of outlets 30. In some embodiments, re-connecting the at least one inlet 32 of the first movable bay 14a to the at least one outlet 30 of the core 12 comprises re-connecting the plurality of inlets 32 to the plurality of outlets 30.

Optionally, the method further comprises moving the first movable bay 14a to the holding area 24 after disconnecting the first movable bay 14a from the core 12 and prior to establishing the second configuration of components 34. Then, the first movable bay 14a is returned to the core 12 prior to re-connecting the first movable bay 14a thereto. In some embodiments, the method further comprises cleaning the first movable bay 14a while it is located in the holding area 24 and prior to establishing the second configuration of components 34. In some embodiments, the method further comprises connecting the second, third, fourth, fifth, or sixth movable bays 14b-14f to the core 12 while the first movable bay 14a is connected to the core 12 without connecting any of the second, third, fourth, fifth, or sixth movable bays 14b-14f to the first movable bay 14a.

Preferably, performing each of the manufacturing processes in each bay 14 comprises performing one or more of a chemical, a biological, and a pharmaceutical manufacturing process. Embodiments of manufacturing processes include but are not limited to one or preferably 2, 3, 4, 5, 6, 7, 8, 9, 10, 11, 12, 13, 14, 15, 16 or more of any of the manufacturing processes described hereinabove, as well as any other manufacturing process not specifically described hereinabove.

In some embodiments, the method further comprises performing a third, fourth, fifth, and/or sixth manufacturing process within the second, third, fourth, fifth, and sixth movable bays 14*b*-14*f* in parallel with performing the first manufacturing process within the first movable bay 14*a*. In some embodiments, the third manufacturing process is distinct from the first manufacturing process. Thus, it should be appreciated that the invention advantageously provides a flexible system whereby a single movable manufacturing bay 14, whether it be the first, second, third, fourth, fifth, or sixth bay 14*b*-14*f* described herein, or any other bay, can be easily connected and disconnected from the core 12 such that different manufacturing processes can be carried out therein with different configurations of manufacturing components 34.

In another aspect, the invention provides a method of manufacturing a plurality of products that includes connecting the first movable bay 14*a* to the first dock position 18*a* of the core 12, whereby the first dock position 18*a* is first selected from the plurality of dock positions 18*a*-18*f*. Then, a first manufacturing process is performed with a configuration of components 34 disposed within the first movable bay 14*a* to manufacture a first product. Then, the first movable bay 14*a* is disconnected from the first dock position 18*a* of the core 12, and a different (e.g., second, third, fourth) movable bay 14 is connected to the first dock position 18*a*. A manufacturing process is then performed with a configuration of components 34 disposed within the different movable bay 14 to manufacture a different product or a same product. In some instances, the time period required for disconnecting the first movable bay 14*a* from the first dock position 18*a* and connecting the different movable bay 34 to the first dock position 18*a* can be 48 hours or less, or 36 hours or less, or 24 hours or less, or 12 hours or less, or 8 hours or less, for example. In some other instances, the time period required for disconnecting the first movable bay 14*a* from the first dock position 18*a*, connecting the different movable bay 34 to the first dock position 18*a*, and beginning to perform the manufacturing process to manufacture the different products can be 48 hours or less, or 36 hours or less, or 24 hours or less, or 12 hours or less, or 8 hours or less, for example.

With this method, it should be appreciated that the system 10 of the present disclosure provides the flexibility of being able to quickly switch from manufacturing one product in the first bay 14*a* to manufacturing a different (or same) product in a different bay 14 without having to reconfigure (or clean) the components 34 in the first bay 14*a*. This can reduce manufacturing downtime and increase the overall productivity of the system 10.

In some embodiments, the method further comprises supplying at least one utility from the core 12 to the movable bays 14 when the movable bays 14 are connected to the core 12. The at least one utility is preferably selected from the group consisting of (a) clean air, (b) sterile water, (c) oxygen, and (d) carbon dioxide. Further utilities can be supplied, including those discussed hereinabove. In other embodiments, three or more of the utilities, preferably selected from the group consisting of (a) clean air, (b) clean water, (c) electricity, (d) oxygen, and (e) carbon dioxide, are supplied from the core 12 to the movable bays 14 when the movable bays 14 are connected to the core 12. Optionally, further utilities may be supplied, including but not limited to any of the utilities described herein. Moreover, in this method, the movable bays 14 can be connected and disconnected from the core 12 in any of the manners described hereinabove with the previous method, or in any other manner known in the art. Furthermore, identical to that described above, performing each of the manufacturing processes comprises performing one or more of a chemical, a biological, and a pharmaceutical manufacturing process or portions or steps of manufacturing processes. Embodiments of manufacturing processes include but are not limited to one or preferably 2, 3, 4, 5, 6, 7, 8, 9, 10, 11, 12, 13, 14, 15, 16 or more of any of the manufacturing processes described herein.

In yet another related aspect, the invention provides a method of manufacturing that includes selecting the first bay 14*a* from a plurality of available bays 14*a*-14*f*. The first bay 14*a* is then moved adjacent to the core 12 and removably connected thereto. Next, the second bay 14*b* is selected from the plurality of available bays 14*a*-14*f* and moved adjacent to the core 12. The second movable bay 14*b* is then removably connected to the core 12. With the first and second movable bays 14*a*, 14*b* removably connected to the core, a first manufacturing process is performed with the components 34 disposed within the first bay 14*a* to manufacture a first product, and a second manufacturing process is performed in parallel with the first manufacturing process with the components 34 disposed within the second bay 14*b* to manufacture a second product.

It should be appreciated that this method provides the advantage of enabling manufacturing personnel to select one or more bays 14 from any number of available bays for performing multiple process in parallel. The number of available bays is limitless. The number of manufacturing processes that may be performed in parallel is only limited by the specific design and configuration of the core 12 and the capacity of the core 12 to supply utilities. The remainder of the system and the means for connecting and disconnecting the bays 14 are the same as those discussed above.

In some embodiments, the method further comprises controlling the first manufacturing process with a first control system associated with the first bay 14*a*, and controlling the second manufacturing process with a second control system associated with the second bay 14*b*. In this configuration, the first and second control systems can be distinct control systems. In some embodiments, the second manufacturing process is controlled independently of the first manufacturing process.

In yet another aspect, the invention provides a method of manufacturing that includes selecting a first bay 14*a* and a second bay 14*b* from a plurality of available bays 14*a*-14*f* and utilizing the first and second bays 14*a*, 14*b* to perform sequential portions of a single manufacturing process. After selection, the first and second bays 14*a*, 14*b* are moved to the core 12 and removably coupled thereto. With the first movable bay 14*a* coupled to the core 12, a product undergoes a first portion of a manufacturing process with the components 34 stored in the first bay 14*a* to bring the product to a first stage of manufacture. The product in the first stage of manufacture is then transferred to the second bay 14*b*. With the second bay 14*b* coupled to the core 12, the product undergoes a second portion of the manufacturing process with the components 34 stored in the second bay 14*b* to bring the product to a second stage of manufacture.

In still another aspect, the invention provides a method of manufacturing that includes selecting a first bay from a plurality of available bays 14*a*-14*f*, moving the first bay 14*a* to the core 12, and removably coupling the first bay thereto. With the first movable bay 14*a* coupled to the core 12, a product undergoes a first portion of a manufacturing process with the components 34 stored in the first bay 14a to bring the product to a first stage of manufacture. Then, the method includes selecting a second bay 14b from the plurality of available bays 14a-14f, moving the second bay 14b to the core 12, and removably coupling it thereto. With the second bay 14b coupled to the core 12, the product in the first stage of manufacture is then transferred from the first bay 14a to the second bay 14b. The product then undergoes a second portion of the manufacturing process with the components 34 stored in the second bay 14b to bring the product to a second stage of manufacture.

In some embodiments, either or both of the foregoing sequential manufacturing methods could further include selecting a third manufacturing bay 14c from the available bays 14a-14f, moving the third bay 14c to the core 12, and coupling the third bay 14c to the core 12. So configured, the product in the second stage of manufacture is transferred to the third bay 14c. With the third bay 14c coupled to the core 12, the product undergoes a third portion of the manufacturing process with the components 34 stored in the third bay 14c to bring the product to a third stage of manufacture.

By the foregoing, it should be appreciated that the use of the terms first, second, and third portions of manufacturing processes and first, second, and third stages of manufacture are only used to express the relative order of these processes or stages, and that each may be intermediate to an overall process or progression through multiple stages.

It should be appreciated that in some aspects of the methods described, the overall manufacturing process is divided into a plurality of portions, wherein each portion is performed in a separate and distinct manufacturing bay 14 sequentially, for example. In contrast, in other aspects of the methods described, the overall manufacturing process is performed in a single bay 14. In some embodiments, however, the single bay 14 could be separated or subdivided into a plurality of different sections divided from each other by movable or openable partitions such as doors, walls, curtains, etc. So configured, the various portions of the overall manufacturing process can be performed in isolated areas of each individual bay, if desired. Any one of the foregoing types of processes is within the scope of the present application, and the practical application of the invention will depend on the specific product being manufactured, as well as the quantity being manufactured.

For example, in some embodiments, the invention provides a method of manufacturing 500 liters of product (e.g., culture supernatant containing unpurified product), wherein the first bay 14 includes components 34 for culturing such that the first stage of manufacture includes cultured cells of the product. The cultured cells of the product can then be transferred to the second bay 14b for fermenting such that the second stage of manufacture comprises fermented product. The fermented product can then be transferred to the third bay 14c for purification such that the third stage of manufacture comprises purified product. This can be the end of the manufacturing process. In other embodiments, more or less than 500 liters of product can be manufactured. For example, in one embodiment, 2000 liters of product could be manufactured. The increased volume could foreseeably require the manufacturing process to be divided into one or more additional portions requiring, for example, one or more additional separate bays 14.

For example, when manufacturing 2000 liters of product, the cultured product produced in the first bay 14a can be transferred to the second bay 14b to undergo a pre-viral purification portion of the overall manufacturing process such that the second stage of manufacture comprises a pre-viral purified product. The pre-viral purified product can then be transferred to the third bay 14c for undergoing a post-viral purification portion of the overall manufacturing process, thereby resulting in a post-viral purified product. The post-viral purified product can then be transferred to a fourth bay 14d, which has already been selected from the available bays 14a-14f and coupled to the core 12, for undergoing a further purification portion of the process such as to yield purified product. The purified product can be the final end product.

In some embodiments, the method further includes any number of the additional process steps discussed hereinabove. Various structures suitable for transferring an intermediate product or stage of manufacture from one bay to another bay are described below.

While the manufacturing system 10 of the present disclosure has thus far been described as optionally including externally located entry and exit rooms 48, 50 for providing controlled access to the bays 14, as illustrated in FIG. 1, alternative embodiments could be configured to include different mechanisms for controlling access to the bays 14.

Figure 4:
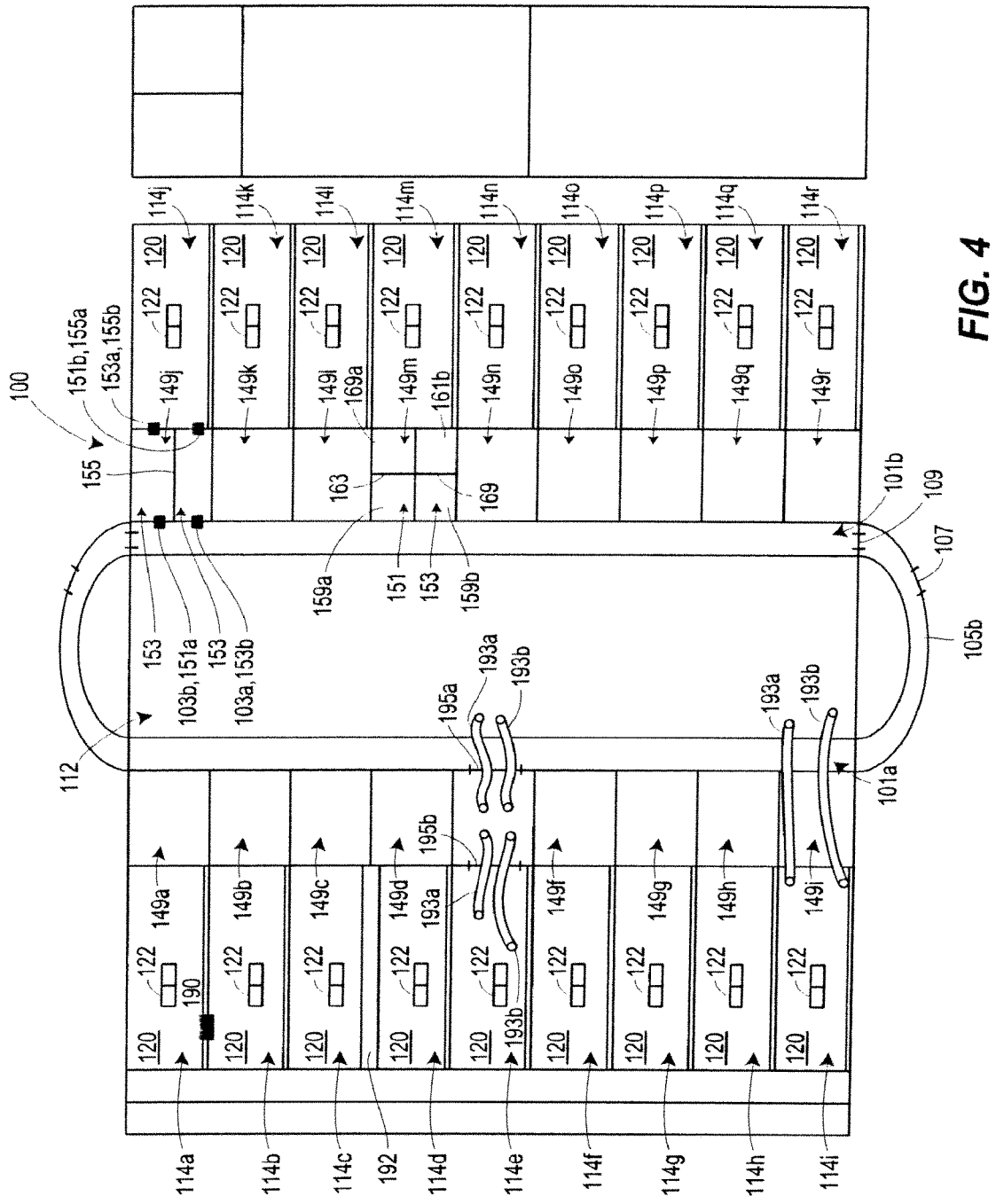
FIG. 4 is a plan view of another embodiment of a manufacturing system of the invention.

For example, FIG. 4 illustrates one alternative embodiment of a system 100 constructed in accordance with the present disclosure, and including one or a plurality of clean connect areas 149, which are coupled (e.g., removably, fixedly) to a core 112. In some embodiments, one clean connect area 149 is disposed adjacent to a movable manufacturing bay 114. In other embodiments, one or more clean connect areas 149 are disposed adjacent to one or more movable manufacturing bays 114. In the embodiment depicted in FIG. 4, the system 100 includes first through eighteenth clean connect areas 149a-149r and a corresponding first through eighteenth movable bays 114a-114r. The clean connect areas 149a-149r are generic and not specifically assigned to any one bay 114. As such, one clean connect area 149a-149r can serve any one of the bays 114a-114r. In some embodiments, the core 112 is rectangular in shape and the bays 114a-114r connect thereto along each side in a linear arrangement. With the exception of its shape, the core 112 can be identical to and include each and every feature of the core 12 described above with reference to FIGS. 1-3. Additionally, each of the bays 114a-114r define workspaces 120 accommodating facilities 122 for performing manufacturing processes and can be identical to and include each and every feature of the bays 14 described above with reference to FIGS. 1-3. Accordingly, each and every feature of the core 112 and bays 114a-114r depicted in FIG. 4 will not be repeated.

Similar to the entry and exit rooms 48, 50 described above with reference to FIG. 1, the clean connect areas 149a-149r of the system 100 depicted in FIG. 4 can be adapted to control access to and from the respective bays 114a-114r. As such, each clean connect area 149a-149r generally includes a square or rectangular structure defining a selectively sealable room positioned between a corresponding one of the bays 114a-114r and a corridor (e.g., one of two primary corridors 101a, 101b), through which operating personnel can pass into and out of the clean connect areas 149a-149r. In the disclosed embodiment, the primary corridors 101a, 101b extend as part of and along opposite sides of the core 112 and are sealed therefrom such that personnel cannot pass between the core 112 and the primary corridors 101a, 101b. In other embodiments, the primary corridors 101a, 101b could be located at a position spaced away from the core 112, as depicted in FIG. 7.

Figure 7:
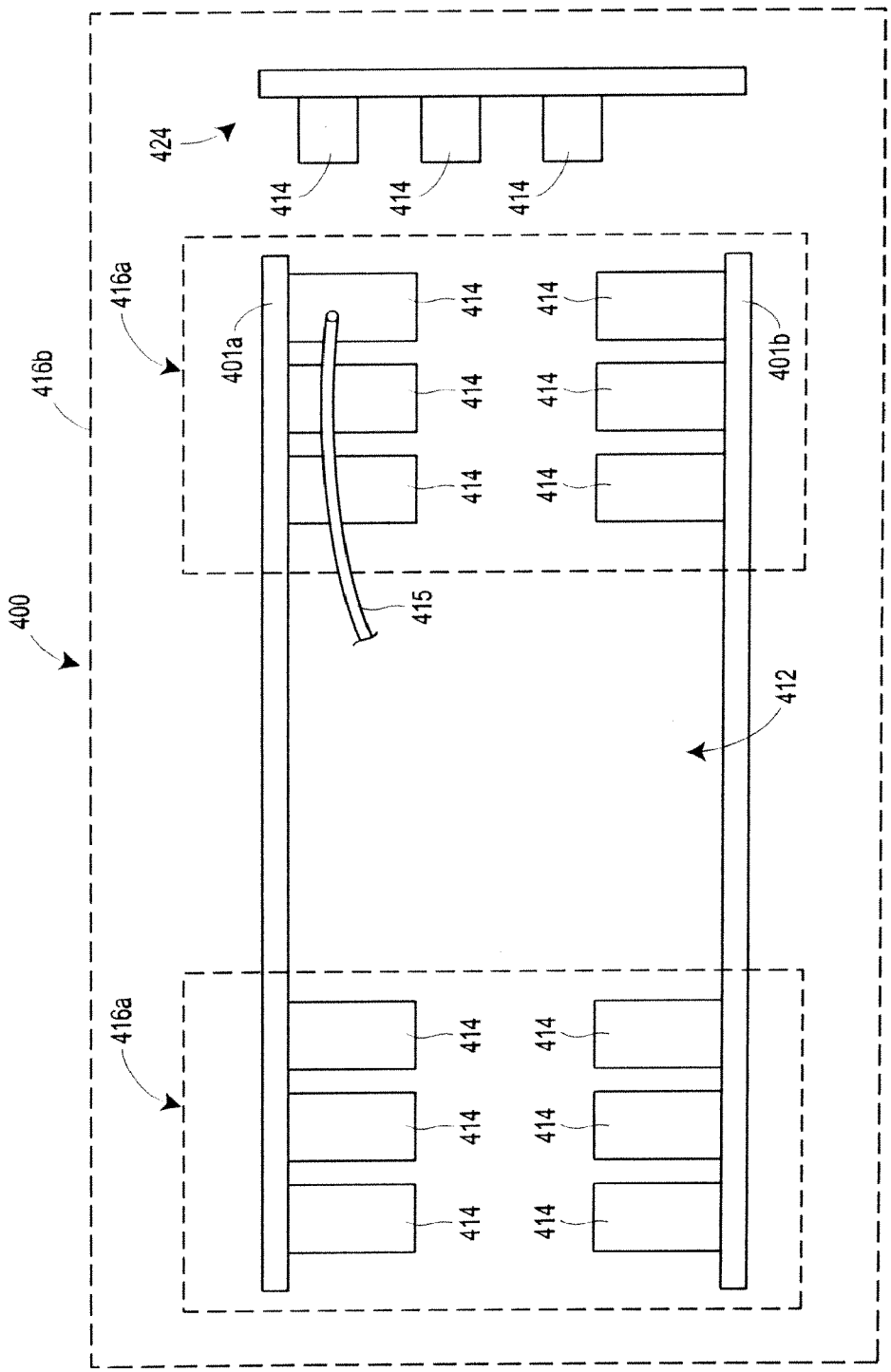
FIG. 7 is a plan view of another embodiment of a manufacturing system of the invention.

For example, FIG. 7 depicts a system 400 including core 412, a plurality of movable manufacturing bays 414, and a pair of primary corridors 401a, 401b. In general, each of these components can be constructed identical to any of the similar components described herein, and therefore, the details will not be repeated. Additionally, the system 400 of FIG. 7 can include one or more optional housings 416a covering and possibly surrounding the areas occupied by the bays 414, as illustrated, or a housing 416b could cover or surround the entire system 400 similar to the housing 16 described above with reference to FIG. 1. Still further, although not shown, the system 400 of FIG. 7 could also be equipped to include transfer panels 190 and/or controlled corridors 192 similar to those described above with reference to the system of FIG. 4 for facilitation transfer of product between the bays 414 if desired.

Furthermore, similar to the systems described above, the system 400 of FIG. 7 can be equipped with at least one holding area 424 that can be disposed inside or outside of the one or more housings 416a, 416b. The holding area 424 is preferably disposed away from the core 412 and provides a location where each of the bays 414 can be positioned to undergo (i) a cleaning operation, whereby the workspaces of the first and second movable manufacturing bays are cleaned, (ii) a change-over operation, whereby the facilities of the first and second movable manufacturing bays are altered, (iii) qualifying, preparation and loading of supplies and specific raw materials (including reagents, cells and/or disposable manufacturing components) for the next manufacturing process, and/or (iv) a servicing operation on any of the facilities, utilities, or an HVAC unit associated with the bays 414.

One distinction between the system 400 depicted in FIG. 7 and the system 100 depicted in FIG. 4, for example, is the configuration of the primary corridors 401a, 401 b relative to the core 412. That is, the primary corridors 401a, 401b each extend away from the core 412 such that the bays 414 are positioned at different distances from the core 412. In this embodiment, the bays 414 are still coupled to the core 412 in generally the same manner that the bays 114 are coupled to the core 112 described above with reference to FIG. 4. That is, the system 400 includes conduits 415, only one of which is illustrated for the sake of clarity, that carry utilities from the core 412 to each of the bays 414. In one preferred embodiment, the conduits carrying the utilities from the core 412 extend over the bays 414 and drop down to connect thereto. In other embodiments, however, the conduits can extend from the core 412 in the ground or floor of the system 400, for example, such that the conduits connect beneath the bays 414. In still some other embodiments, the conduits could extend from the core 412 along the primary corridors 401a, 401b to the bays 414, for example, or in generally any other configuration. While the embodiment depicted in FIG. 7 includes the primary corridors 401a, 401b extending from the core 412 in two different directions, i.e., from the left and right side of the core 412, this is merely an example. In some embodiments, one or more primary corridors 401 may extend in only one direction from the core 412, two directions (e.g., opposite) from the core 412, such as depicted in FIG. 7, or three or more directions from the core 412.

While FIG. 4 includes the primary corridors 101a, 101 b extending adjacent to the core 112, and FIG. 7 includes the primary corridors 401a, 401b extending away from the core 412, other systems may not include primary corridors 101a, 101b at all. As shown in FIG. 4, the primary corridors 101a, 101b may be connected to each other by one or more secondary corridors, such as for example, a pair of secondary corridors 105a, 105b located at opposite ends of the core 112 such that personnel can pass between the two primary corridors 101a, 101b and/or out of the system 100 entirely. Similar secondary corridors could be used in the system of FIG. 7, if desired.

As mentioned, in some embodiments, each of the clean connect areas 149a-149r is generally square, or rectangular in shape. In one embodiment, the clean connect areas 149a-149r can be fixedly coupled to the core 112 and each of the bays 114a-114r can be removably coupled to a corresponding clean connect area 149a-149r. That is, flat interior walls of the clean connect areas 149a-149r can be fixedly coupled to the core 112 adjacent flat exterior walls of the corridors 101a, 101b, as depicted. Moreover, flat end walls of the bays 114a-114r can be removably coupled to the core 112 adjacent flat exterior walls of the clean connect areas 149a-149r. In other embodiments, the clean connect areas 149a-149r can be fixedly coupled to the bays 114a-114r and removably coupled to the core 112 via the corridors 101a, 101b. In still further embodiments, the clean connect areas 149a-149r can be structures separate from the core 112 and the bays 114a-114r and separately movable. In such an embodiment, the clean connect areas 149a-149r can be removably coupled to both the core 112 and the respective bays 114a-114r.

As mentioned above, the clean connect areas 149a-149r serve to control access to the bays 114a-114r. Therefore, each of the clean connect areas 149a-149r includes a bay entry portion 151 and a bay exit portion 153 separated and/or sealed from each other by a partition 155 such as a wall, a pane of glass, etc. For the sake of clarity, the present embodiment of the bay entry and exit portions 151, 153 are illustrated with respect to the tenth clean connect area 149j in FIG. 4, but all of the clean connect areas 149a-149r could be equipped in the same manner.

The bay entry portion 151 includes an entry point 151a and an exit point 151b. The bay exit portion 153 includes an entry point 153a and an exit point 153b. The entry point 151a of the bay entry portion 151 is connected to an exit point 103b of the primary corridor 101b and the exit point 153b of the bay exit portion 153 is connected to an entry point 103a of the primary corridor 101b. Moreover, the exit point 151b of the bay entry portion 151 is connected to an entry point 155a of the tenth bay 114j and the entry point 153a of the bay exit portion 153 is connected to an exit point 155b of the tenth bay 114j. Any or all of the entry points 151a, 153a, 103a, 155a and exit points 151b, 153b, 103b, 155b in the clean connect areas 149a-149r, the bays 114a-114r, and corridors 101a, 101 b can include selectively closeable passageways such as sliding doors, pivoting doors, pocket doors, pocket doors with seals, roll doors, curtains, removable or collapsible walls, or any other type of device capable of at least providing physical separation and optionally providing a seal such as an airtight seal when closed.

With the clean connect areas 149a-149r configured as described, operating personnel can enter and exit the bays 114a-114r in a controlled manner to prevent contamination of the contents of the bays 114a-114r and/or to prevent cross-contamination between the bays 114a-114r.

For example, to enter a specific bay, e.g., the tenth bay 114j described with reference to FIG. 4, operating personnel must first enter the system 100 via a passageway 107 in one of the secondary corridors 105a, 105b. In some alternative embodiments, personnel may first enter the system 100 directly via a passageway in the primary corridors 101a, 101b. At this point, the operating personnel can still be wearing street clothes or something similar. In the disclosed embodiment, the secondary corridors 105a, 105b can be uncontrolled spaces, i.e., spaces that are not required to satisfy any "clean air" standards such as those discussed above, or otherwise. From the secondary corridor 105a, 105b, the operating personnel can enter the primary corridor 101b through another passageway 109. In one embodiment, the primary corridors 101a, 101b can be maintained to satisfy a "clean air" standard. For example, the primary corridors 101a, 101b could be maintained to satisfy, for example, any one of the Federal Standard 209E classifications of air including Class 1, Class 10, Class 100, Class 1,000, Class 10,000, and in some embodiments Class 100,000.

From the primary corridor 101b, the operating personnel can pass through the exit point 103b of the primary corridor 101b and the entry point 151a of the bay entry portion 151 of the clean connect area 149j to enter the bay entry portion 151. Once in the bay entry portion 151, the operating personnel can don a clean gown, clean scrubs, a clean suit, or some other "clean" attire before entering the tenth bay 114j. Once the operating personnel is prepared to enter the tenth bay 114j, the operating personnel can pass through the exit point 151b of the bay entry portion 151 and the entry point 155a of the tenth bay 114j and into the workspace 120 to assist in the performance of a manufacturing process, a cleaning process, etc.

To exit the workspace 120 of the tenth bay 114j, the personnel passes through the exit point 155b of the tenth bay 114j and the entry point 153a of the bay exit portion 153 of the clean connect area 149j, thereby entering the bay exit portion 153. When disposed in the bay exit portion 153, the operating personnel can degown and exit the bay exit portion 153 of the clean connect area 149j via the exit point 153b of the bay exit portion 153 and the entry point 103a of the primary corridor 101b. From the primary corridor 101b, the personnel can return to one of the secondary corridors 105a, 105b to exit the system 100, for example. Thus, the clean connect areas 149a-149r operate to control the flow of personnel into and out of the bays 114a-114r to prevent contamination.

In one embodiment, each of the clean connect areas 149a-149r can be cleaned and/or maintained to satisfy any one of the Federal Standard 209E classifications of air including Class 1, Class 10, Class 100, Class 1,000, Class 10,000, and Class 100,000. Preferably, the clean connect areas 149a-149r can be maintained to satisfy the same standard classification as that which is maintained within the respective bays 114a-114r. For example, for bio-manufacturing, the air within the clean connect areas 149a-149r and the bays 114a-114r can be maintained at Class 10,000, i.e., the air contains less than 10,000 particles that are 0.5 microns and larger per cubic foot of air within the clean connect areas 149a-149r and the bays 114a-114r. To facilitate and maintain the air classifications in the bays 14 and clean connect areas 149, the HVAC air-handling system for the bays 14 can be additionally equipped to ensure that air flows from the bays 14, through the clean connect areas 149, and out to the corridors 101a, 101b. Preferably, the pressure differential between the bays 14 and the clean connect areas 149, and the pressure differential between the clean connect areas 149 and the corridors 101a, 101 b, would be maintained at five hundredths of an inch (0.05") of water, as is generally known within the art. In other embodiments, wherein the bays 14 are utilized to manufacture viruses, for example, the HVAC air-handling system can be used to ensure that air flows into the bays 14 from the corridors 101a, 101b. So configured, the bays 14 could be equipped with filters and/or sinks that would trap any stray particles in the air and prevent them from escaping the controlled environment. While the air within the clean connect areas 149a-149r and the bays 114a-114r has thus far been described as satisfying the same air classification standards, in other embodiments, the air within the clean connect areas 149a-149r and the bays 114a-114r could be maintained at different standards.

While the clean connect areas 149a-149r have thus far been described as defining bay entry and bay exit portions 151, 153 separated by a partition 155, alternative embodiments of the clean connect areas 149a-149r can also subdivide either or both of the bay entry and exit portions 151, 153. For example, as illustrated with respect to the thirteenth clean connect area 149m depicted in FIG. 4, one embodiment of the bay entry portion 151 could be divided into a first stage entry portion 159a and a second stage entry portion 161a separated by a transition divider 163. The transition divider 163 can include a selectively closeable passageway such as a sliding door, a pivoting door, a pocket door, a roll door, one or more curtains, or any other type of device capable of at least providing a designated and/or physical separation and optionally providing a seal such as an airtight seal when closed.

In such a configuration, operating personnel can first enter the first stage entry portion 159a of the clean connect area 149m to don a first level of clean attire, e.g., clean scrubs, and then pass through the transition divider 163 and into the second stage entry portion 161a to don a second level of clean attire, e.g., a clean suit, over the first set of clean attire, prior to passing into the workspace 120 of the thirteenth bay 114m. Upon exiting the workspace 120 of the thirteenth bay 114m, the operating personnel can remove the first and second levels of clean attire in the bay exit portion 153 in a manner similar to that described above with respect to the tenth clean connect area 149j.

In alternative embodiments, the bay exit portion 153 of the clean connect area 149m can also be subdivided into first and second stage exit portions 161b, 159b separated by a transition divider 169 for enabling operating personnel to successively remove the second level of clean attire while in the first stage bay exit portion 161b and the first level of clean attire while in the second stage bay exit portion 159b.

In one embodiment, the air within the first and second stage entry portions 159a, 161 a and the first and second stage exit portions 161b, 159b can be maintained in accordance with the same or different air classification standards. For example, in one embodiment, the first stage entry portion 159a and the second stage exit portion 159b can be maintained at Class 100,000, while the second stage entry portion 161a and the first stage exit portion 161b can be maintained at Class 10,000, which can be the same as the workspace 120 of the corresponding thirteenth bay 114m, for example.

While only the thirteenth clean connect area 114m has been described as including first and second stage entry portions 159a, 161 a and optional first and second stage exit portions 159b, 161 b, it should be appreciated that all or some of the clean connect areas 149a-149r can be arranged in such a manner. Moreover, while the bay entry and exit portions 151, 153 of the thirteenth clean connect area 149m have each been disclosed as being optionally subdivided into two stage portions, e.g., a first stage entry portion 151a and a second stage entry portion 161a, in alternative embodiments, the bay entry and/or exit portions 151, 153 of any or all of the clean connect areas 149a-149r could be subdivided into 3, 4, 5, 6, 7, 8, 9, 10, or any other number of stage portions.

In the embodiment depicted in FIG. 4, the provision of utilities from the core 112 to each of the bays 114a-114r must be sealed from the primary corridors 101a, 101 b. For example, in one form described with reference to the ninth bay 114i depicted in FIG. 4, the utilities supplied from the core 112 could be provided within one or more sealed flexible conduits 193a, 193b passing above, below, and/or through the primary corridor 101a. In the depicted form, the conduits 193a, 193b extend from a fixed location in the core 112 where the utilities originate and terminate at a location adjacent to the respective bay 114i. So configured, the one or more conduits 193a, 193b also pass above, below, and/or through the associated clean connect area 149i. Moreover, the terminal end of the one or more conduits 193a, 193b can be removably connected to an external fitting of the bay 114i with any of the mechanical coupling means described above with reference to FIGS. 1-3 such that the bay 114i can be removed and swapped out for other bays in accordance with the teachings of the present disclosure.

In another embodiment, the clean connect areas 149a-149r or portions (e.g., subdivided sections) thereof can serve as a designated space for personnel to make the utility connections between the core 112 and the bays 114a-114r. For example, with reference to the fifth bay 114e depicted in FIG. 4, each of the clean connect areas 149a-149r could include selectively sealable openings 195a, 195b on opposing end walls thereof. The opening 195a on the wall adjoining the core 112 would be for receiving one or more sealed flexible conduits 193a, 193b from the core 112, and the opening 195b on the wall adjoining the bay 114e would be for receiving one or more sealed flexible conduits 193a, 193b from the corresponding bay 114e. So configured, any method of attaching the bay 114e to the core 112 would include receiving the conduits 193a, 193b through the respective openings. Once received, a seal such as a rubber skirt, collar, or other mechanism, for example, can be closed or constricted around the conduits 193a, 193b to provide an airtight seal. Thereafter, the clean connect area 149 could be brought to a state of cleanliness and a technician, for example, positioned within the clean connect area 149e could then connect the one or more conduits 193a, 193b extending from the core 112 to the one or more corresponding conduits 193a, 193b extending from the associated bay 114e. So configured, in this embodiment, the clean connect areas 149a-149i can provide a "clean" area for making the utility connections in addition to or as an alternative to providing controlled access to the bays 114a-114i, as described above.

In general, any of the methods of using the manufacturing system 10 described above with reference to FIG. 1 apply in the same manner to the system 100 depicted in FIG. 4. However, the methods can also be modified to include various features related more specifically to the clean connect areas 149a-149r. For example, one method of manufacturing a plurality of products using the system 100 depicted in FIG. 4 can further include connecting a first movable bay 114 to a clean connect area 149 prior to performing a first manufacturing process in the first movable bay 114. Moreover, the method can include disconnecting the first movable bay 114 from the clean connect area 149 prior to connecting a different, second movable bay 114 to the same position of the core 112. Finally, the method can further include connecting the second movable bay 114 to the clean connect area 149 previously occupied by the first movable bay 114 prior to performing another, second manufacturing process.

In another embodiment, the method can further include connecting entry points 155a of each of the first and second movable bays 114 to exit points 151b of the clean connect area 149 and connecting exit points 155b of each of the first and second movable bays 114 to entry points 153a of the clean connect area 149. Moreover, the method can include disconnecting the entry point 155a of the first movable bay 114 from the exit point 151b of the clean connect area 149 and disconnecting the exit point 155b of the first movable bay 114 from the entry point 153a of the clean connect area 149.

Still further, the system 100 depicted in FIG. 4 can also be adapted to facilitate the method described above wherein the manufacturing process is broken into a plurality of sequential portions, each portion being performed in a separate and distinct manufacturing bay 114. For example, as discussed above, at the end of each portion of the manufacturing process, the product is transferred from one bay to another bay until the desired product or stage of manufacture is produced. As depicted in FIG. 4, each of the bays 114 are disposed side-by-side, and as such, could include corresponding transfer panels 190 for transferring the product between the bays 114. In FIG. 4, each of the first and second bays 114a, 114b are illustrated as including a transfer panel 190 that is aligned with the transfer panel 190 of the other bay, but it should be appreciated that any or all of the bays 114 could include a similar transfer panel. In some embodiments, the transfer panels 190 could merely include a window, door, or other type of panel that can be opened/closed to pass product through by hand, for example. In some embodiments, the transfer panel 190 can include a sealable conduit that extends between the first and second bays 114a, 114b for pumping product therebetween. In some embodiments, the sealable conduits can include, at least in part, disposable conduits that can be replaced at the end of each manufacturing cycle for example.

Instead of modifying the system 100 of FIG. 4 to include the transfer panels 190, another embodiment could include controlled corridors 192 disposed between or extending from and connecting adjacent bays 144 to facilitate transfer of product between the bays when performing the sequential manufacturing process. FIG. 4 identifies a single controlled corridor 192 disposed between the third and fourth bays 114c, 114d, but it should be appreciated that similar controlled corridors 192 could be disposed between or extending from and connecting any or all of the adjacent bays 114. The air in the controlled corridors would preferably be maintained at the same classification level as that maintained in the bays 114, i.e., preferably Class 10,000 such that manufacturing personnel could travel between bays 114 without compromising the clean state thereof. Moreover, although not depicted, each of the bays 114 would require at least one door, for example, enabling passage from the bays 114 to the controlled corridor 192. As such, at the end of a first portion of a manufacturing process performed in the third bay 114c of FIG. 4, for example, the manufacturing personnel could exit the third bay 114c carrying or otherwise transporting the product into the controlled corridor 192. Once in the controlled corridor 192, the door to the third bay 114c would be closed and sealed, and then the door to the fourth bay 114d could be opened to enable the personnel to enter the fourth bay 114d with the product.

Figure 5:
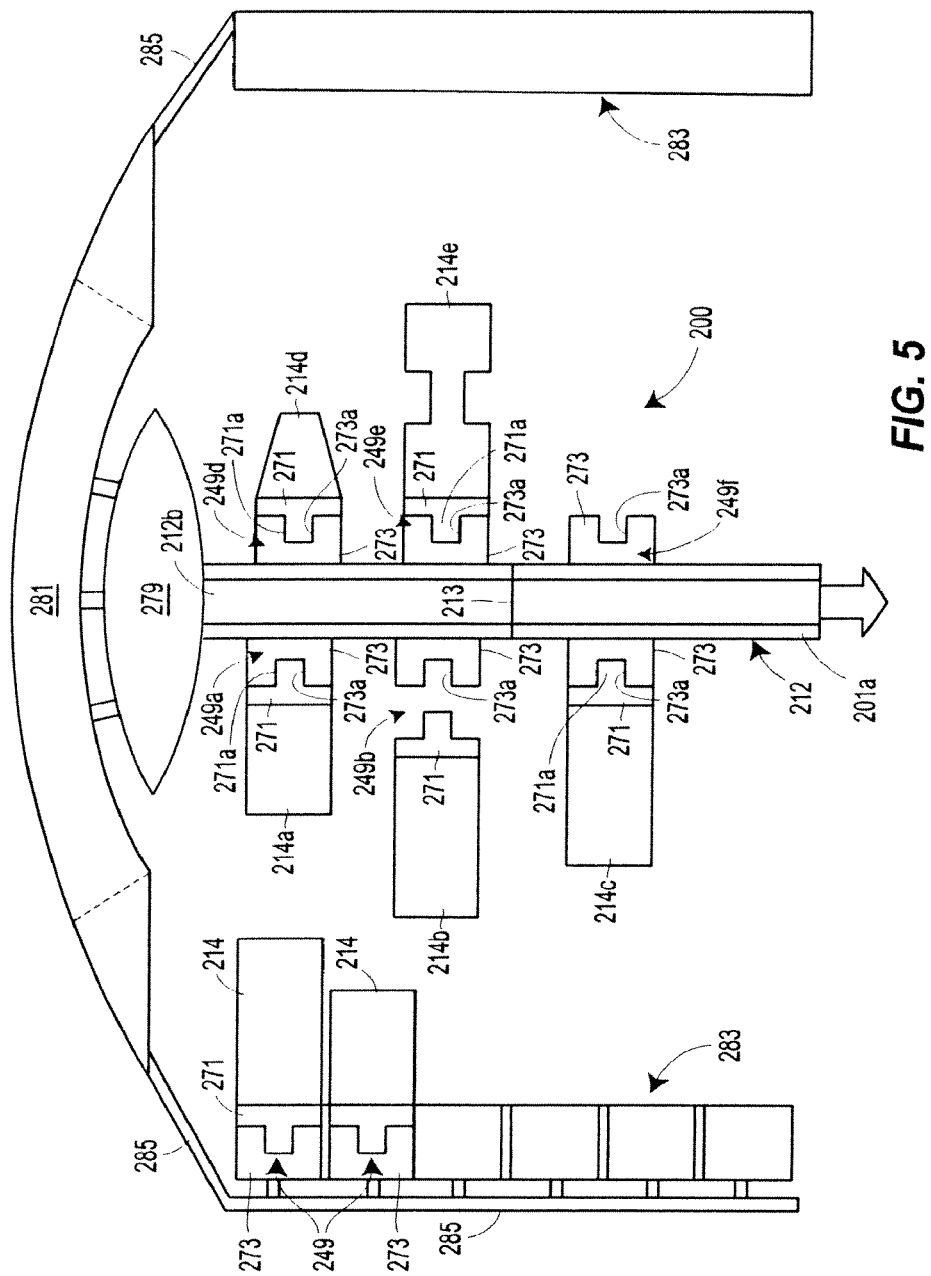
FIG. 5 is a plan view of another embodiment of a manufacturing system of the invention.

Referring now to FIG. 5, a further system 200 constructed in accordance with the principles of the present disclosure is illustrated including a core 212 and a plurality of movable manufacturing bays 214 connected or connectable to the clean connect core 212. The core 212 and the bays 214 can be identical to and include each and every feature of any of the bays 14, 114 described above, and therefore, each and every feature will not be repeated.

Similar to the system 100 described above with reference to FIG. 4, the system 200 includes two primary corridors 201a, 201b disposed along the core 212 and between the core 212 and the bays 214 to provide operating personnel access to the bays 214. Additionally, similar to the system 100 described above with reference to FIG. 4, the system 200 includes a plurality of clean connect areas 249 disposed or disposable adjacent to a corresponding plurality of the bays 214 for controlling access to the bays 214. Still further, although not shown, the system 100 of FIG. 5 could also be equipped to include transfer panels 190 and/or controlled corridors 192 similar to those described above with reference to the system of FIG. 4 for facilitation transfer of product between the bays 214 if desired. In FIG. 5, the system 200 includes first through fifth movable bays 214a-214e coupled to a corresponding first through fifth clean connect areas 249a-249e. A sixth clean connect area 249f coupled to the core 212 remains open and available for being coupled to another movable bay 214. While the system 200 in FIG. 5 only includes six clean connect areas 249 coupled to the core 212, this is only an example, the system 200 could include any number of clean connect areas 249. Unlike the system 100 described with reference to FIG. 4, however, each of the clean connect areas 249 of the system 200 depicted in FIG. 5 includes a male component 271 and a female component 273. In FIG. 5, the male and female components 271, 273 of the clean connect areas 249 are illustrated schematically to convey the general concept. Any practical embodiment of such components 271, 273 may not necessarily assume the form depicted, especially in terms of shape, scale, dimension, proportion, etc.

Each of the male components 271 is fixedly connected to one of the plurality of movable manufacturing bays 214. Each of the female components 273 is fixedly connected to the core 212, adjacent to one of the primary corridors 201a, 201b. In alternative embodiments, the male components 271 can be fixedly coupled to the core 212 and the female components 273 can be fixedly coupled to the bays 214. As such, when a bay 214 is coupled to the core 212, a tongue 271a of the male component 271 of the clean connect area 249 is disposed within a recess 273a in the female component 273 to interlock the bay 214 to the core 212. Such interlocking configuration of the male and female components 271, 273 of the clean connect areas 249 can assist in properly aligning the bays 214 to the core 212 to ensure that any connections for the utilities supplied from the core 212 can properly align with connections carried by the bays 214 and/or clean connect areas 249. To facilitate the passage of operating personnel between the male component 271 and the female component 273, each can be equipped with entry and exit points similar to the entry and exit points between the clean connect areas 149 and bays 114 described above with reference to the system 100 depicted in FIG. 4. Therefore, the details will not be repeated. Other features and characteristics of the clean connect areas 249 can be identical to and include each and every feature of the clean connect areas 149 described above, and therefore, will not be repeated.

With continued reference to FIG. 5, the two corridors 201a, 201b of the system 200 are connected to a controlled area 279, which is in turn connected to an uncontrolled area 281. A "controlled area," as used herein, means an area that is maintained to satisfy a "clean air" standard such as one of the clean air standards discussed hereinabove. As such, an "uncontrolled area," as used herein, is an area that is not maintained in accordance with a "clean air" standard. The uncontrolled area 281 can be further connected to one or more changeover facilities 283 via controlled and/or uncontrolled corridors 285. The changeover facilities 283 can be adapted to receive one or more bays 214 for cleaning or changing the components therein in preparation to perform additional runs of the same manufacturing processes or perform different manufacturing processes, identical to that which was described above with respect to the holding areas 24 of the system 10 depicted in FIGS. 1-3. As depicted on the left-hand side of FIG. 5, the changeover facilities 283 can have a plurality of female components 273 adapted to receive male components 271 to establish clean connect areas 249 between the changeover facility 283 and the bays 214. As such, operating personnel can access the bays 214 from the uncontrolled corridors 285 through the clean connect areas 249 in a manner identical to that which was described above with reference to FIG. 4. Although not depicted, the changeover facility 283 on the right-hand side of FIG. 5 can be equipped in a manner identical to the changeover facility 283 on the left-hand side of FIG. 5.

Still referring to FIG. 5, the system 200 is further distinct from the systems 10, 100 described above in that the core 212 includes two separate core components 212a, 212b connected together at an adjoining wall 213. In essence, the two core components 212a, 212b are extensions of each other and operate in conjunction to provide utilities to the plurality of bays 214, as needed. In one embodiment, each core component 212a, 212b is movable such that, if desired, the system 200 could operate with a single core component, such as core component 212b, for example. Moreover, it is foreseeable that the system 200 could be equipped with additional core components (not shown) that could be moved into position and connected to the existing core 212 to increase the operating capacity of the entire system 200. These additional core components could be attached to the end of core component 212b, as illustrated by the arrow in FIG. 5.

In view of the foregoing, it should be appreciated that any of the methods of using the manufacturing systems 10, 100 described above with reference to FIG. 1 and FIG. 4 apply in the same manner to the system 200 depicted in FIGS. 5 and 7, and therefore, the details thereof will not be repeated.

Thus far, the present disclosure has described various systems 10, 100, 200, 400 wherein movable bays 14, 114, 214, 414 are connected or connectable to a core 12, 112, 212, 414 that supplies various utilities to the bays 14, 114, 214, 414. In each of the disclosed embodiments, the core 12, 112, 212, 412 is located beside the bays 14, 114, 214, 414. In an alternative embodiment, a system constructed in accordance with the present disclosure can be configured such that at least some of the utilities can be supplied to the bays 14, 114, 214, 414 from above to obtain various advantages, such as for example advantages associated with utilizing the force of gravity to deliver the utilities and/or advantages of spatially separating the locations of utility couplings and personnel access.

Figure 6:
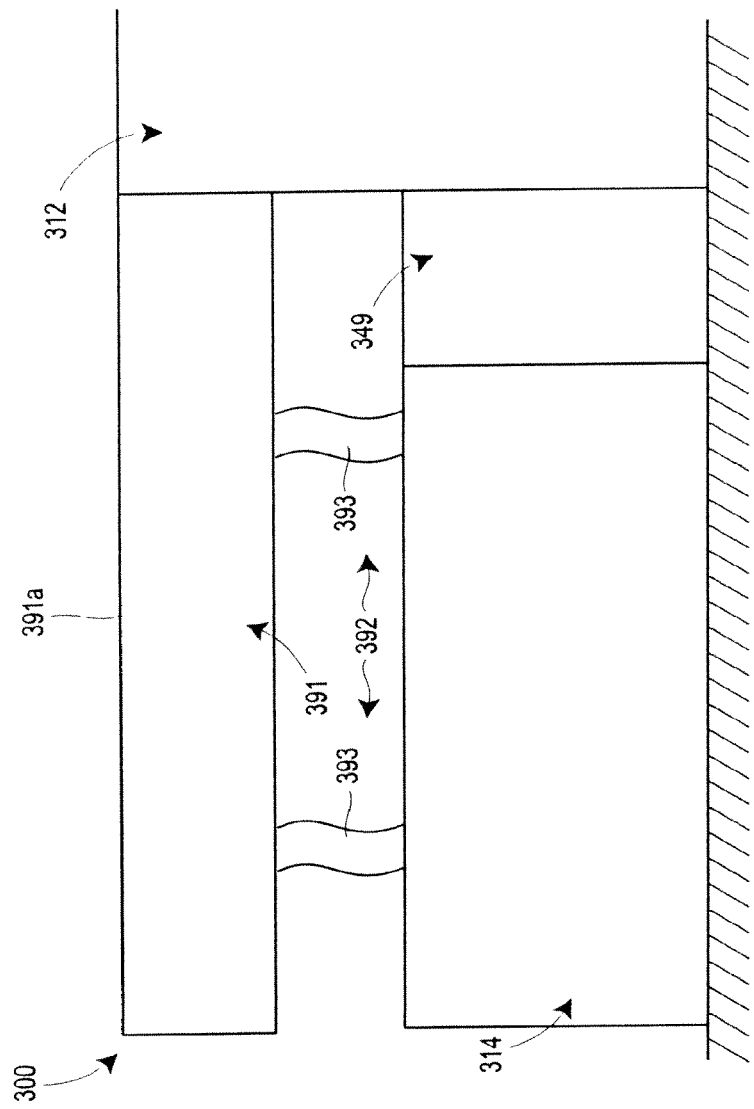
FIG. 6 is a side view of an optional upper docking collar.

For example, FIG. 6 partially depicts an alternative embodiment of a system 300 constructed in accordance with the present disclosure wherein one bay 314 of a plurality of bays is removably coupled to a core 312 via a clean connect area 349 and removably coupled beneath an upper docking collar 391. While FIG. 6 illustrates a single upper docking collar 391, the system 300 could include a plurality of docking collars 391 disposed at a plurality of locations, respectively, on the core 312, at which any one of a plurality of bays 314 could be docked. The plurality of docking collars 391 could be entirely independent, separate and disconnected from each other, connected, or contiguous. For example, although the description and claims may refer to a first docking collar, a second docking collar, etc., these two components may be portions of a single contiguous docking collar. An interstitial maintenance space 392 separates the upper docking collar 391 from the top of the bay 314 when the bay 314 is connected to the core 312. In the disclosed embodiment, the upper docking collar 391 extends outward from and is fixedly coupled to the core 312. Similar to the core 312, the upper docking collar 391 is isolated from the bay 314 such that operating personnel cannot pass between the bay 314 and the upper docking collar 391. In some embodiments, personnel can pass between the upper docking collar 391 and the core 312.

As mentioned, the upper docking collar 391 supplies one or more utilities to the bay 314. This can be facilitated by the incorporation of one or more conduits 393 extending downward from the upper docking collar 391 to the bay 314. That is, the collar 391 could include ports for connecting to the conduits 393, which in some embodiments could include lines, such as gamma irradiated disposable lines with valves for liquid transfer, for example. When the bay 314 is moved into position beneath the upper docking collar 391, as depicted, maintenance personnel can access the interstitial maintenance space 392 to make the connections between the upper docking collar 391 and bay 314 with the one or more conduits 393. It is foreseeable that the one or more conduits may include electrical lines, data lines, air ducts, fluid lines, gas lines, etc.

In one embodiment, the one or more utilities supplied from the upper docking collar 391 includes one or more of (a) clean air, (b) clean water, (c) electricity, (d) oxygen, (e) carbon dioxide, (f) a nutritional media, (g) a dilution buffer, (h) a purification media, and (i) a local area network. Other embodiments could include other utilities supplied from the upper docking collar 391. To supply clean air to the bay 314, the upper docking collar 391 can be equipped with HVAC equipment. Positioning the HVAC equipment in the upper docking collar 391 above the bay 314 maximizes the amount of space available for exhausting heat and related gases through a roof 391a of the upper docking collar 391. Additionally, when the HVAC equipment is used to provide cool air to the bay 314, positioning the HVAC equipment above the bay 314 facilitates the delivery of the cool air, which is heavier than warm air, and therefore naturally travels downward under the force of gravity. Moreover, storing clean water and the various liquid media, which is utilized during bio-manufacturing processes, in the upper docking collar 391 allows for gravity feeding, which eliminates or at least reduces the number of pumps required in the system. Reducing or eliminating the number of pumps required to operate the manufacturing facility can advantageously reduce energy costs, maintenance costs, and heat generation, as well as increase the overall efficiency of the system.

In general, any of the methods of using the manufacturing systems 10, 100, 200, 400 described above with reference to FIGS. 1, 4, 5, and 7 apply in the same manner to the system 300 depicted in FIG. 6. However, the methods can also be modified to include various features related to the clean connect area(s) 149 and/or upper docking collar(s) 391. For example, any method of manufacturing a plurality of products using the system 300 can further include connecting one or more movable bays 314 to one or more corresponding upper docking collars 391 prior to performing manufacturing processes in the movable bays 314. Moreover, any method of using the system 300 can further include delivering one or more utilities under the force of gravity from the upper docking collars 391 to the bays 314 during the respective manufacturing processes.

Moreover, in some embodiments, the force of gravity can be utilized to deliver one or more utilities to the bays without using the upper docking collar 391 described with reference top FIG. 6. For example, as described above with reference to FIGS. 4 and 7, in some embodiments, the utilities can be supplied to the bays 114, 414 from the core 112, 412 via conduits 193a, 193b, 415. As discussed above, the conduits 193a, 193b, 415 can be arranged to travel from the core 112, 412 above the bays 114, 414 such that they drop down and connect to the bays 114, 414. In such a configuration, at least some of the utilities delivered via the conduits 193a, 193b, 415 could experience the force of gravity upon entering the bays 114, 414. Thus, it should be appreciated that delivering utilities to the bays 14, 114, 214, 314, 414 is not limited to an embodiment that requires an upper docking collar 391, but rather, the upper docking collar 391 is merely one embodiment for accomplishing this.

While various methods of manufacturing products have been described herein as being distinct methods, it should be appreciated that any aspect of the various methods, or the entire methods, may be combined with the other methods to construct a single method of manufacturing utilizing the system 10 disclosed herein.

While the bays of the various embodiments of the systems described herein have been generally depicted as including static dimensions defining, some embodiments of the bays could be equipped with movable walls, pop-out walls, or sections, for example, that would enable the size of the workspace to be altered. So configured, the workspace size could be increased to accommodate large capacity manufacturing processes, and/or the external dimensions of the bays could be decreased to facilitate the maneuverability of the bays during transport.

The foregoing embodiments serve only to illustrate the invention and are not intended to limit the scope of the invention in any way. While the inventions have been described with an emphasis upon preferred embodiments, it will be obvious to those of ordinary skill in the art that variations of the preferred arrangements and components may be used within the manufacturing system and variations of the methods may be used. It is thus intended that the invention may be practiced otherwise than as specifically described herein. Accordingly, this invention includes all modifications encompassed within the spirit and scope of the invention as defined by the following aspects, which represent a non-exhaustive listing of examples or embodiments of the invention, and the appending claims.

Aspect 1: A manufacturing system comprising: a core adapted to supply two or more utilities to one or more manufacturing bays, wherein at least two of the two or more utilities are selected from the group consisting of (a) clean air, (b) clean water, (c) electricity, (d) oxygen, and (e) carbon dioxide; a first movable manufacturing bay removably coupled to or adapted to be removably coupled to the core and for receiving the utilities; a first workspace defined by the first movable manufacturing bay and accommodating a first facility for performing a first manufacturing process; a second movable manufacturing bay removably coupled to or adapted to be removably coupled to the core and for receiving the utilities; and a second workspace defined by the second movable manufacturing bay, the second workspace isolated from the first workspace and accommodating a second facility for performing a second manufacturing process in parallel with the first facility performing the first manufacturing process.

Aspect 2: A manufacturing system, comprising: a core for supplying one or more utilities to one or more manufacturing bays; a first movable manufacturing bay removably coupled to or adapted to be removably coupled to the core for receiving the one or more utilities; a first workspace defined by the first movable manufacturing bay and accommodating a first facility for performing a first manufacturing process; a first clean connect area adapted to be coupled to the first movable manufacturing bay and selectively isolated from the first workspace, the first clean connect area for performing at least one of the following functions when coupled to the first movable manufacturing bay: (a) controlling personnel flow to and from the first movable manufacturing bay and (b) providing a clean area for connecting the utilities between the core and the first movable manufacturing bay; a second movable manufacturing bay removably coupled to or adapted to be removably coupled to the core for receiving the one or more utilities; a second workspace defined by the second movable manufacturing bay, the second workspace isolated from the first workspace and accommodating a second facility for performing a second manufacturing process in parallel with the first facility performing the first manufacturing process; and a second clean connect area adapted to be coupled to the second movable manufacturing bay and selectively isolated from the second workspace, the second clean connect area for performing at least one of the following functions when coupled to the second movable manufacturing bay: (a) controlling personnel flow to and from the second movable manufacturing bay and (b) providing a clean area for connecting the utilities between the core and the second movable manufacturing bay.

Aspect 3: A manufacturing system comprising: a core supplying one or more utilities to one or more manufacturing bays; a first movable manufacturing bay removably coupled to or adapted to be removably coupled to the core and receiving the utilities; a first workspace defined by the first movable manufacturing bay and accommodating a first facility for performing a first manufacturing process; a second movable manufacturing bay removably coupled to or adapted to be removably coupled to the core and receiving the utilities; a second workspace defined by the second movable manufacturing bay, the second workspace isolated from the first workspace and accommodating a second facility for performing a second manufacturing process; and a surface (e.g., wall, floor, counter and/or sink) or area, e.g., for aseptic processing disposed within one of the first and second movable manufacturing bays, the surface having one, two, three or all organism counts selected from the group consisting of: (a) viable particulate air organism count of $\leq 100$ $CFU/m^3$, (b) settling plate organism count of $\leq 50$ CFU/4 hours, and (c) Replicate Organisms Detection and Counting (RODAC) plate organism count of $\leq 25$ CFU/plate.

Aspect 4: A manufacturing system, comprising: a core for supplying a plurality of utilities; a first movable manufacturing bay removably coupled to the core for receiving the one or more utilities; a first workspace defined by the first movable manufacturing bay and accommodating a first facility for performing a first manufacturing process; a first upper docking collar disposed above and removably coupled to the first movable manufacturing bay when the first movable manufacturing bay is connected to the core, the first upper docking collar for supplying at least one utility to the first manufacturing bay that is distinct from each of the plurality of utilities supplied by the core; a second movable manufacturing bay removably coupled to the core for receiving the one or more utilities; a second workspace defined by the second movable manufacturing bay, the second workspace isolated from the first workspace and accommodating a second facility for performing a second manufacturing process; and a second upper docking collar disposed above and removably coupled to the second movable manufacturing bay when the second movable manufacturing bay is connected to the core, the second upper docking collar for supplying at least one utility to the second manufacturing bay that is distinct from each of the plurality of utilities supplied by the core.

Aspect 5: The system of any one of the preceding aspects, wherein the first and second movable manufacturing bays are not connected to each other.

Aspect 6: The system of any one of the preceding aspects, further comprising: a first clean connect area adapted to be disposed adjacent the first movable manufacturing bay when the first movable manufacturing bay is connected to the core, the first clean connect area for performing at least one of the following functions: (a) controlling access to and from the first movable manufacturing bay and (b) providing a clean area for connecting the utilities between the first movable manufacturing bay and the core; and a second clean connect area adapted to be disposed adjacent to the second movable manufacturing bay when the second movable manufacturing bay is connected to the core, the second clean connect area for performing at least one of the following functions: (a) controlling access to and from the second movable manufacturing bay and (b) providing a clean area for connecting the utilities between the second movable manufacturing bay and the core.

Aspect 7: The system of any one of the preceding aspects, wherein at least a portion of the first clean connect area is coupled to the core and adapted to be removably coupled to the first movable manufacturing bay, and at least a portion of the second clean connect area is coupled to the core and adapted to be removably coupled to the second movable manufacturing bay.

Aspect 8: The system of any one of the preceding aspects, wherein each of the first and second clean connect areas comprises a bay entry portion and a bay exit portion isolated from each other.

Aspect 9: The system of any one of the preceding aspects, wherein the bay entry portion of each of the first and second clean connect areas comprises an exit point adapted to be connected to an entry point of the first and second movable manufacturing bays, respectively, such that operating personnel can pass from the first and second clean connect areas into the first and second movable manufacturing bays, respectively, when the first and second movable manufacturing bays are connected to the core, and the bay exit portion of each of the first and second clean connect areas comprises an entry point adapted to be connected to an exit point of the first and second movable manufacturing bays, respectively, such that operating personnel can pass from the first and second movable manufacturing bays into the first and second clean connect areas, respectively, when the first and second movable manufacturing bays are connected to the core.

Aspect 10: The system of any one of the preceding aspects, wherein the first and second movable manufacturing bays are sealed from the core, except for the supply of the two or more utilities, when the first and second movable bays are removably coupled to the core.

Aspect 11: The system of any one of the preceding aspects, wherein the core is sealed from receiving incoming material from the first and second movable manufacturing bays.

Aspect 12: The system of any one of the preceding aspects, further comprising: first and second outlets associated with the core, each of the first and second outlets adapted to discharge at least one of the utilities; at least one first inlet associated with the first movable manufacturing bay, the at least one first inlet adapted to be removably coupled to the first outlet of the core; and at least one second inlet associated with second movable manufacturing bay, the at least one second inlet adapted to be removably coupled to the second outlet of the core.

Aspect 13: The system of any one of the preceding aspects, wherein each of the first and second outlets of the core comprises a plurality of outlets, each of the plurality of outlets adapted to supply a distinct utility of the two or more utilities, and each of the first and second inlets of the first and second movable manufacturing bays, respectively, comprises a plurality of inlets adapted to be removably coupled to the plurality of outlets of the first and second outlets of the core, respectively, each of the plurality of first inlets for receiving a distinct utility from one of the plurality of first outlets and each of the plurality of second inlets for receiving a distinct utility from one of the plurality of second outlets.

Aspect 14: The system of any one of the preceding aspects, wherein each of the first and second facilities comprises a plurality of components, each of which is adapted to perform one or more steps of a chemical, a biological, or a pharmaceutical manufacturing process.

Aspect 15: The system of any one of the preceding aspects, wherein the plurality of components comprises at least one of a culturing component, a harvesting component, a purifying component, a biosafety cabinet, one or more culture flasks, an incubator, a carbon dioxide incubator, a cell counter, a cell viability measuring device, an osmolarity measuring device, a metabolite measuring device, a lactate dehydrogenase measuring device, a sealer, sterile connecting devices, a microscope, a water bath, a peristaltic pump, a bioreactor, including single use or disposable bioreactors, a wave bioreactor, a media batch tank, a buffer holding tank, an agitator, a sparger, a light house for plants, a tank for growing algae/duckweed, a room for mushrooms, a pump, a piston pump, a diaphragm pump, a rotary lobe pump, a positive displacement pump, a flow control valve, a centrifuge component, a disk stack centrifuge, a pressure regulator, a surge tank, a cell lysis component, a mechanical disruptor, a shredder and/or extractor and/or vacuum system for separating proteins from plants, algae or mushrooms, a depth filter component, a clarification filter, a holding tank, an ultrafiltration component, a diafiltration component, an ultrafiltration/diafiltration system, a drain line, a heat removal component, a recirculation tank jacket, a heat exchanger, a laminar flow hood, a freezing system, one or more cryovessels, one or more cold baths, one or more liquid nitrogen systems, one or more freeze/thaw components, a spray-dryer, a freeze-dryer, a buffer dilution skid, an ion exchange chromatography column or membrane or skid or bed, an affinity chromatography column or membrane or skid or bed, a hydrophobic interaction chromatography column or membrane or skid or bed, a hydrophobic charge induction chromatography column or membrane or skid or bed, a liquid chromatography column or membrane or skid or bed, a high pressure liquid chromatography column or membrane or skid or bed, a gas chromatography column or membrane or skid or bed (for both separation of organic molecules and for analysis), other separation technologies, a size exclusion chromatography column or membrane or skid or bed, a metal affinity chromatography column or membrane or skid or bed, a protein A chromatography column or membrane or skid or bed, a hydroxyapatite column or membrane or skid or bed, disposable purification systems, process control systems, a filter housing, an ultraviolet analyzer, a conductivity probe, a steam seal, a steam trap, a glasswasher, an autoclave, a sterilizing filter, one or more sterile containers, one or more sterile vials, one or more sterile syringers, a lyophilizer, a fume hood (optionally connected to an outlet in the bay) and related equipment for chemical synthesis, an evaporator for removing solvents (optionally connected to an outlet in the bay), a crystallization system for purifying organics, one or more computer networks for individual bays and for the core facilities, one or more analytical devices for assaying products, electrophoresis equipment (eg, SDS-PAGE), a pH meter, a mass spectrometer, an IR spectrometer, a UV spectrophotometers (for analysis or detection during processing), in-line analytics attached to fermentation and purification systems, disposable fermentation systems from 20 L-5000 L or more using stir (e.g., Xcellerex) or movement (e.g., GE Healthcare Wave), centrifugation equipment for either discontinuous or continuous separation, clean air hoods or containment systems for filling, wiring for or wireless systems for monitoring or automated processes, gas lines for clean air or specialty gases, water lines, pumps for fluid transfer, containers for product collection, freezer and cold room areas, non-aqueous solvent storage systems, control systems and specialty software for automation and apparatus controls.

Aspect 16: The system of any one of the preceding aspects, wherein the plurality of components comprises at least one of a culturing component, a harvesting component, one or more culture flasks, an incubator, a carbon dioxide incubator, a cell counter, a bioreactor, a media batch tank, a cell lysis component, an autoclave, a sterilizing filter, electrophoresis equipment such as an SDS-PAGE.

Aspect 17: The system of any one of the preceding aspects, wherein the plurality of components comprises at least one of a purifying component, a biosafety cabinet, a sparger, a mechanical disruptor, an ultrafiltration component, a diafiltration component, an ultrafiltration/diafiltration system, a laminar flow hood, one or more cryovessels, an ion exchange chromatography column or membrane or skid or bed, an affinity chromatography column or membrane or skid or bed, a hydrophobic interaction chromatography column or membrane or skid or bed, a hydrophobic charge induction chromatography column or membrane or skid or bed, a size exclusion chromatography column or membrane or skid or bed, a metal affinity chromatography column or membrane or skid or bed, a protein A chromatography column or membrane or skid or bed, a hydroxyapatite column or membrane or skid or bed, a liquid chromatography column or membrane or skid or bed, a high pressure liquid chromatography column or membrane or skid or bed, a gas chromatography column or membrane or skid or bed, a lyophilizer, one or more extractor systems, one or more evaporators each with an outlet in the bay, crystallization systems for purifying organics, one or more in-line analytics attached to fermentation and purification systems, one or more disposable fermentation systems.

Aspect 18: The system of any one of the preceding aspects, wherein the culturing component comprises a bioreactor.

Aspect 19: The system of any one of the preceding aspects, wherein the purifying component comprises a chromatography system.

Aspect 20: The system of any one of the preceding aspects, wherein the first movable manufacturing bay comprises a first control system for controlling the first manufacturing process, and the second movable manufacturing bay comprises a second control system for controlling the second manufacturing process independent of the first manufacturing process.

Aspect 21: The system of any one of the preceding aspects, wherein each of the first and second movable manufacturing bays comprises a drain for discharging waste generated during the first and second manufacturing processes, respectively.

Aspect 22: The system of any one of the preceding aspects, wherein at least one of the bay entry portion and the bay exit portion of each of the first and second clean connect areas contains no more than approximately 10,000 particles 0.5 microns and larger per cubic foot of air.

Aspect 23: The system of any one of the preceding aspects, wherein each of the first and second workspaces defined by the first and second movable manufacturing bays, respectively, contains a number of particles that are 0.5 microns and larger per cubic foot of air, the number being in the range of approximately 1 to approximately 100,000.

Aspect 24: The system of any one of the preceding aspects, wherein the number of particles is approximately 10,000.

Aspect 25: The system of any one of the preceding aspects, further comprising: a first upper docking collar adapted to be disposed above the first movable manufacturing bay and removably connected to the first movable manufacturing bay when the first movable manufacturing bay is connected to the core, the first upper docking collar containing at least one utility for being supplied to the first workspace while performing the first manufacturing process; and a second upper docking collar adapted to be disposed above the second movable manufacturing bay and removably connected to the second movable manufacturing bay when the second movable manufacturing bay is connected to the core, the second upper docking collar containing at least one utility for being supplied to the second workspace while performing the second manufacturing process.

Aspect 26: The system of any one of the preceding aspects, wherein the first and second upper docking collars are fixedly coupled to the core.

Aspect 27: The system of any one of the preceding aspects, wherein the at least one utility contained within the first and second upper docking collars is selected from the group consisting of: (a) clean air, (b) clean water, (c) electricity, (d) oxygen, (e) carbon dioxide, (f) a nutritional media, (g) a dilution buffer, (h) a purification media, and (i) a local area network.

Aspect 28: The system of any one of the preceding aspects, wherein at least one of the first movable manufacturing bay and the second movable manufacturing bay comprises a hood for aseptic processing, the hood having one, two, three or all organism counts selected from the group consisting of: (a) viable particulate air organism count of <1 CFU/m$^3$, (b) settling plate organism count of <1 CFU/4 hours, (c) Replicate Organisms Detection and Counting (RODAC) plate organism count of <1 CFU/plate, and (d) touch plate organism count of <1 CFU/plate.

Aspect 29: The system of any one of the preceding aspects, wherein at least one of the first movable manufacturing bay and the second movable manufacturing bay comprises a surface (e.g., wall, floor, counter and/or sink) or area, e.g., for aseptic processing, the surface having one, two, three or all organism counts selected from the group consisting of: (a) viable particulate air organism count of ≤10 CFU/m$^3$, (b) settling plate organism count of ≤5 CFU/4 hours, (c) Replicate Organisms Detection and Counting (RODAC) plate organism count of ≤5 CFU/plate, and (d) touch plate organism count of ≤5 CFU/plate.

Aspect 30: The system of any one of the preceding aspects, wherein at least one of the first movable manufacturing bay and the second movable manufacturing bay comprises a surface (e.g., wall, floor, counter and/or sink) or area, e.g., for fermentation and/or purification processes, the surface having one, two, three or all organism counts selected from the group consisting of: (a) viable particulate air organism count of ≤100 CFU/m$^3$, (b) settling plate organism count of ≤50 CFU/4 hours, and (c) Replicate Organisms Detection and Counting (RODAC) plate organism count of ≤25 CFU/plate.

Aspect 31: The system of any one of the preceding aspects, further comprising one of a transfer panel and a controlled corridor disposed between the first and second movable manufacturing bays for facilitating the transfer of product therebetween.

Aspect 32: The system of any one of the preceding aspects, further comprising a housing containing at least one of the core, the first movable manufacturing bay, and the second movable manufacturing bay.

Aspect 33: The system of any one of the preceding aspects, further comprising a housing containing the core, the first movable manufacturing bay, and the second movable manufacturing bay.

Aspect 34: The system of any one of the preceding aspects, wherein the housing comprises a holding area disposed away from the core where each of the first and second movable manufacturing bays can be positioned to undergo a cleaning operation, whereby the workspaces of the first and second movable manufacturing bays are cleaned, or a change-over operation, whereby the facilities of the first and second movable manufacturing bays are altered.

Aspect 35: The system of any one of the preceding aspects, wherein the core, the first movable manufacturing bay, and the second movable manufacturing bay are arranged in a hub and spoke configuration with the first and second movable manufacturing bays circumferentially spaced around the core.

Aspect 36: A method of manufacturing a plurality of products, comprising: removably connecting a first movable bay to a core; performing a first manufacturing process with a first configuration of components disposed within the first movable bay to manufacture a first product; disconnecting the first movable bay from the core; establishing a second configuration of components within the first movable bay; re-connecting the first movable bay to the core; and performing a second manufacturing process with the second configuration of components to manufacture a second product, the second manufacturing process being distinct from the first manufacturing process.

Aspect 37: A method of manufacturing a plurality of products, comprising: removably connecting a first movable bay to a first position of a core, the first position selected from a plurality of positions; performing a first manufacturing process with a configuration of components disposed within the first movable bay to manufacture a first product; disconnecting the first movable bay from the first position of the core; removably connecting a second movable bay to the first position of the core; and performing a second manufacturing process with a configuration of components disposed within the second movable bay to manufacture a second product.

Aspect 38: A method of manufacturing, comprising: selecting a first bay from a plurality of available bays; removably connecting the first bay to the core; selecting a second bay from the plurality of available bays; removably connecting the second bay to the core; performing a first manufacturing process with a first set of components disposed within the first bay to manufacture a first product; and performing a second manufacturing process in parallel with the first manufacturing process with a second set of components disposed within the second bay to manufacture a second product.

Aspect 39: A method of manufacturing, comprising: selecting a first bay from a plurality of available bays; moving the first bay to a position outside of a core; removably connecting the first bay to the core; selecting a second bay from the plurality of available bays; moving the second bay to a position outside of the core; removably connecting the second bay to the core; performing a first manufacturing process for a first product with a first set of components disposed within the first bay to bring the first product to a first stage of manufacture; and performing a second manufacturing process for the first product with a second set of components disposed within the second bay to bring the first product to a second stage of manufacture.

Aspect 40: The method of any one of the preceding aspects, further comprising supplying at least one utility to the first movable bay, or to the first and second movable bays, from the core when the first movable bay is, or the first and second movable bays are, connected to the core, the at least one utility comprising at least one of (a) clean air, (b) clean water, (c) electricity, (d) oxygen, or (e) carbon dioxide.

Aspect 41: The method of any one of the preceding aspects, further comprising supplying two or more utilities to the first movable bay, or to the first and second movable bays, from the core, at least two of the two or more utilities selected from the group consisting of (a) clean air, (b) clean water, (c) electricity, (d) oxygen, and (e) carbon dioxide.

Aspect 42: The method of any one of the preceding aspects, further comprising supplying three or more utilities to the first movable bay, or to the first and second movable bays, from the core, at least three of the three or more utilities selected from the group consisting of (a) clean air, (b) clean water, (c) electricity, (d) oxygen, and (e) carbon dioxide.

Aspect 43: The method of any one of the preceding aspects, wherein removably connecting the first movable bay to the core comprises connecting at least one inlet of the first movable bay to at least one outlet of the core, wherein the at least one outlet of the core supplies at least one utility, disconnecting the first movable bay from the core comprises disconnecting the at least one inlet of the first movable bay from the at least one outlet of the core, and re-connecting the first movable bay to the core comprises re-connecting the at least one inlet of the first movable bay to the at least one outlet of the core.

Aspect 44: The method of any one of the preceding aspects, wherein removably connecting the first and second movable bays to the core comprises connecting at least one inlet of the first and second movable bays to at least one outlet of the core, wherein the at least one outlet of the core supplies at least one utility.

Aspect 45: The method of any one of the preceding aspects, wherein connecting the at least one inlet of the first and second movable bays to the at least one outlet of the core comprises connecting a plurality of outlets of the core to a plurality of inlets of the first and second movable bays, wherein each of the plurality of outlets supplies a distinct utility.

Aspect 46: The method of any one of the preceding aspects, further comprising: removably connecting the first movable bay to a first clean connect area prior to performing the first manufacturing process, the first clean connect area for performing at least one of the following functions (a) controlling personnel flow to and from the first movable bay and (b) providing a clean area for connecting the utilities between the core and the first movable bay; disconnecting the first movable bay from the first clean connect area prior to removably connecting the second movable bay to the first position of the core; and removably connecting the second movable bay to the first clean connect area prior to performing the second manufacturing process.

Aspect 47: The method of any one of the preceding aspects, wherein removably connecting the first and second movable bays to the first clean connect area comprises connecting an entry point of each of the first and second movable bays to an exit point of the first clean connect area and connecting an exit point of each of the first and second movable bays to an entry point of the first clean connect area; and disconnecting the first movable bay from the first clean connect area comprises disconnecting the entry point of the first movable bay from the exit point of the first clean connect area and disconnecting the exit point of the first movable bay from the entry point of the first clean connect area.

Aspect 48: The method of any one of the preceding aspects, further comprising: removably connecting the first movable bay to a first upper docking collar located above the first movable bay when the first movable bay is connected to the first position of the core prior to performing the first manufacturing process, the first upper docking collar adapted to deliver the one or more utilities to the first movable bay during the first manufacturing process; and removably connecting the second movable bay to the first upper docking collar located above the second movable bay when the second movable bay is connected to the first position of the core prior to performing the second manufacturing process, the first upper docking collar adapted to deliver the one or more utilities to the second movable bay during the second manufacturing process.

Aspect 49: The method of any one of the preceding aspects, further comprising delivering one or more utilities from the first upper docking collar to at least one of the first and second movable bays during at least one of the first and second manufacturing processes.

Aspect 50: The method of any one of the preceding aspects, further comprising: moving the first movable bay to a holding area disposed away from the core after disconnecting the first movable bay from the core, and (i) cleaning the first movable bay or (ii) establishing a different configuration of components within the first movable bay.

Aspect 51: The method of any one of the preceding aspects, further comprising: moving the first bay adjacent to the core after selecting the first bay; and moving the second bay adjacent to the core after selecting the second bay.

Aspect 52: The method of any one of the preceding aspects, further comprising: selecting a third bay from the plurality of available bays; removably connecting the third bay to the core; performing a third manufacturing process in parallel with at least one of the first and second manufacturing processes with a third set of components disposed within the third bay to manufacture a third product.

Aspect 53: The method of any one of the preceding aspects, wherein removably connecting the first bay to the core comprises connecting at least one first inlet of the first bay to at least one first outlet of the core; and removably connecting the second bay to the core comprises connecting at least one second inlet of the second bay to at least one second outlet of the core.

Aspect 54: The method of any one of the preceding aspects, further comprising: removably connecting the first bay to a first clean connect area prior to performing the first manufacturing process, the first clean connect area for performing at least one of the following functions (a) controlling personnel flow to and from the first bay and (b) providing a clean area for connecting the utilities between the core and the first bay; removably connecting the second movable bay to a second clean connect area prior to performing the second manufacturing process, the second clean connect area for performing at least one of the following functions (a) controlling personnel flow to and from the second bay and (b) providing a clean area for connecting the utilities between the core and the second bay.

Aspect 55: The method of any one of the preceding aspects, wherein removably connecting the first bay to the first clean connect area comprises connecting an entry point of the first bay to an exit point of the first clean connect area and connecting an exit point of the first bay to an entry point of the first clean connect area; and removably connecting the second bay to the second clean connect area comprises connecting an entry point of the second bay to an exit point of the second clean connect area and connecting an exit point of the second bay to an entry point of the second clean connect area.

Aspect 56: The method of any one of the preceding aspects, further comprising: removably connecting the first bay to a first upper docking collar located above the first bay when the first bay is connected to the core prior to performing the first manufacturing process, the first upper docking collar adapted to deliver the one or more utilities to the first bay during the first manufacturing process; and removably connecting the second bay to a second upper docking collar located above the second bay when the second bay is connected to the core prior to performing the second manufacturing process, the second upper docking collar adapted to deliver the one or more utilities to the second bay during the second manufacturing process.

Aspect 57: The method of any one of the preceding aspects, further comprising delivering one or more utilities from the first upper docking collar to the first bay during the first manufacturing process, delivering one or more utilities from the second upper docking collar to the second bay during the second manufacturing process.

Aspect 58: The method of any one of the preceding aspects, further comprising: controlling the first manufacturing process with a first control system associated with the first bay; and controlling the second manufacturing process with a second control system associated with the second bay, the first and second control systems being distinct control systems.

Aspect 59: The method of any one of the preceding aspects, wherein controlling the second manufacturing process comprises controlling the second manufacturing process independently of the first manufacturing process.

Aspect 60: The method of any one of the preceding aspects, further comprising: disconnecting the first bay from the core after performing the first manufacturing process; moving the first bay to a holding area disposed away from the core; performing at least one of the following operations: (a) cleaning the first set of components to define a third set of components, (b) reconfiguring the first set of components to define a third set of components, and (c) replacing at least some of the first set of components with a third set of components; removably re-connecting the first bay to the core; and performing a third manufacturing process with the third set of components in the first bay in parallel with the second set of components in the second bay performing the second manufacturing process.

Aspect 61: The method of any one of the preceding aspects, further comprising moving the first bay to a position adjacent to the core prior to removably re-connecting the first bay to the core.

Aspect 62: The method of any one of the preceding aspects, further comprising moving the first product at the first stage of manufacture from the first bay to the second bay.

Aspect 63: The method of any one of the preceding aspects, wherein moving the first product from the first bay to the second bay comprises transferring the first product from the first bay to the second bay.

Aspect 64: The method of any one of the preceding aspects, wherein transferring the first product from the first bay to the second bay comprises one or more of the following actions: (a) transferring the first product from the first bay to the second through a conduit, a line, a tube, or other connecting means, and (b) transporting the first product from the first bay to the second bay in a container or vessel.

Aspect 65: The method of any one of the preceding aspects, wherein pumping the first product comprises pumping the first product through at least one transfer panel comprising a conduit that extends from the first bay to the second bay.

Aspect 66: The method of any one of the preceding aspects, wherein carrying the first product from the first bay to the second bay comprises moving the first product through a controlled corridor disposed between the first bay and the second bay.

Aspect 66: The method of any one of the preceding aspects, further comprising: selecting a third bay from the plurality of available bays; moving the third bay to a position outside of the core; removably connecting the third bay to the core; performing a third manufacturing process on the first product with a third set of components disposed within the third bay to bring the first product to a third stage of manufacture.

Aspect 67: The method of any one of the preceding aspects, further comprising: removably connecting the first movable bay to a first clean connect area prior to performing the first manufacturing process, the clean connect area for performing at least one of the following functions (a) controlling personnel flow to and from the first movable bay and (b) providing a clean are for connecting the utilities between the first movable bay and the core; disconnecting the first movable bay from the first clean connect area prior to establishing the second configuration of components within the first movable bay; and re-connecting the first movable bay to the first clean connect area prior to performing the second manufacturing process.

Aspect 68: The method of any one of the preceding aspects, wherein connecting the at least one inlet of the first movable bay to the at least one outlet of the core comprises connecting a plurality of outlets of the core to a plurality of inlets of the first movable bay, wherein each of the plurality of outlets supplies a distinct utility, disconnecting the at least one inlet of the first movable bay from the at least one outlet of the core comprises disconnecting the plurality of inlets from the plurality of outlets, and re-connecting the at least one inlet of the first movable bay to the at least one outlet of the core comprises re-connecting the plurality of inlets to the plurality of outlets.

Aspect 69: The method of any one of the preceding aspects, wherein removably connecting and re-connecting the first movable bay to the first clean connect area comprises connecting an entry point of the first movable bay to an exit point of the first clean connect area and connecting an exit point of the first movable bay to an entry point of the first clean connect area; and disconnecting the first movable bay from the first clean connect area comprises disconnecting the entry point of the first movable bay from the exit point of the first clean connect area and disconnecting the exit point of the first movable bay from the entry point of the first clean connect area.

Aspect 70: The method of any one of the preceding aspects, further comprising: removably connecting the first movable bay to a first upper docking collar located above the first movable bay prior to performing the first manufacturing process, the first upper docking collar adapted to deliver the one or more utilities to the first movable bay during at least one of the first and second manufacturing processes; disconnecting the first movable bay from the first upper docking collar prior to establishing the second configuration of components within the first movable bay; and re-connecting the first movable bay to the first upper docking collar prior to performing the second manufacturing process.

Aspect 71: The method of any one of the preceding aspects, further comprising delivering one or more utilities from the first upper docking collar to the first movable bay during at least one of the first and second manufacturing processes.

Aspect 72: The method of any one of the preceding aspects, wherein the at least one utility is selected from the group consisting of (a) clean air, (b) clean water, (c) a nutritional media, (d) a dilution buffer, and (e) a purification media.

Aspect 73: The method of any one of the preceding aspects, further comprising maintaining a hood for aseptic processing within the first movable manufacturing bay to have one, two, three or all organism counts selected from the group consisting of: (a) viable particulate air organism count of <1 CFU/m$^3$, (b) settling plate organism count of <1 CFU/4 hours, (c) Replicate Organisms Detection and Counting (RODAC) plate organism count of <1 CFU/plate, and (d) touch plate organism count of <1 CFU/plate.

Aspect 74: The method of any one of the preceding aspects, further comprising maintaining a surface (e.g., wall, floor, counter and/or sink) or area, e.g., for aseptic processing, within the first movable manufacturing bay to have one, two, three or all organism counts selected from the group consisting of: (a) viable particulate air organism count of ≤10 CFU/m$^3$, (b) settling plate organism count of ≤5 CFU/4 hours, (c) Replicate Organisms Detection and Counting (RODAC) plate organism count of ≤5 CFU/plate, and (d) touch plate organism count of ≤5 CFU/plate.

Aspect 75: The method of any one of the preceding aspects, further comprising maintaining a surface (e.g., wall, floor, counter and/or sink) or area, e.g., for aseptic processing, within the first movable manufacturing bay to have one, two, three or all organism counts selected from the group consisting of: (a) viable particulate air organism count of ≤100 CFU/m$^3$, (b) settling plate organism count of ≤50 CFU/4 hours, and (c) Replicate Organisms Detection and Counting (RODAC) plate organism count of ≤25 CFU/plate.

Aspect 76: The method of any one of the preceding aspects, further comprising: moving the first movable bay to a holding area disposed away from the core after disconnecting the first movable bay from the core and prior to establishing a second configuration of components within the first movable bay.

Aspect 77: The method of any one of the preceding aspects, further comprising cleaning the first movable bay prior to establishing the second configuration of components in the first movable bay.

Aspect 78: The method of any one of the preceding aspects, wherein performing each of the first and second manufacturing processes comprises performing one of a chemical, a biological, and a pharmaceutical manufacturing process.

Aspect 79: The method of any one of the preceding aspects, wherein the chemical, biological, or pharmaceutical manufacturing process is selected from the group consisting of cell inoculum preparation; culturing or fermentation of mammalian cells such as Chinese hamster ovary (CHO) cells, mouse myeloma cell lines, human embryonic kidney, human retinal cells, NSO, HEK293, PER.C6, or cells suitable for replicating viruses, such as African green monkey VERO, MDCK (canine kidney cells), CEF (chicken embryonic fibroblasts), 2BS, Mark145, ST1, DF-1, CIK, EPC; incubation of chicken eggs for vaccine production; culturing or fermentation of bacterial or prokaryotic cells, including but not limited to gram-negative or gram-positive organisms, Enterobacteriaceae such as *E. coli*, e.g. *E. coli* K12 strain, *E. coli* X1776 strain, *E. coli* W3110 strain, and *E. coli* K5, *Enterobacter, Pseudomonas* such as *P. fluorescens* and *P. aeruginosa, Erwinia, Klebsiella, Proteus, Salmonella*, e.g., *Salmonella typhimurium, Serratia*, e.g., *Serratia marcescans*, and *Shigella*, as well as *Bacilli* such as *B. subtilis* and *B. licheniformis*, or *Streptomyces*; culturing fermentation of yeast or fungal cells, including but not limited to *Saccharomyces*, e.g. *S. cerevisiae, Schizosaccharomyces pombe, Kluyveromyces, Pichia*, e.g. *P. pastoris, Candida, Trichoderma, Neurospora*, e.g. *N. crassa, Schwannomyces*, filamentous fungi such as, e.g., *Neurospora, Penicillium, Tolypocladium, neosporidia, Aspergillus*, e.g. *A. nidulans* and *A. niger, Hansenula, Kloeckera, Torulopsis*, or *Rhodotorula*; culturing insect cells, e.g. baculoviral systems, Sf9 cells; growing plant cells, including but not limited to algae, tobacco, algae, duckweed, or mushrooms; inoculating cells or chicken eggs with virus; harvesting cells or virus or culture medium; inactivated vaccine production, including but not limited to heat killed pneumococcal or formalin-treated viruses, live vaccine production, including replication of influenza, or other viruses for vaccines, e.g. measles, mumps, rubella, varicella, polio, rabies, H5N1 virus; viral vector production, including but not limited to adenovirus, AAV, alphavirus, poxvirus, retrovirus, picornavirus, paramyxovirus, rhabdovirus; counting cells, cell viability measurement, osmolarity measurement, metabolite measurement, lactate dehydrogenase measurement; lysing cells; centrifugation processes; filtration processes; freezing processes, including freezing of purified bulk product; thawing processes; purification processes, including but not limited to ion exchange chromatography, affinity chromatography, hydrophobic interaction chromatography, hydrophobic charge induction chromatography, size exclusion chromatography, metal affinity chromatography, protein A chromatography, hydroxyapatite separation, multicolumn countercurrent solvent gradient purification process, buffer dilution processes, formulation and/or filing processes, including but not limited to adding excipients, sterile filtration, filling processes, freeze-drying, spray-drying, pegylation, sealing, labeling, process control, liquid nitrogen storage; peptide synthesis and/or purification processes; siRNA synthesis and/or purification processes; synthesis and/or purification of small organic molecules.

What is claimed:

1. A clean room system, comprising:
    a housing;
    a movable corridor;
    a first modular unit movably disposed within the housing and connected with the movable corridor, the first modular unit comprising:
        a first gowning area located at an end of the first modular unit proximate to the movable corridor;
        a first controlled air, sealable, sterilizable clean room within the first modular unit, the clean room having a first entry point for personnel from the movable corridor through the first gowning area;
        a first utility room within the first modular unit at an end of the first modular unit distal to the movable corridor, the first utility room having a first point of entry for personnel that is separate from the first clean room entry point, wherein the first utility room is configured to be serviced without entering the first clean room; and
        a first HVAC system within the first utility room, the first HVAC system connected with the first clean room via a first supply air duct and a first return air duct, the first HVAC system connected to a central HVAC air-handling unit located within the housing; and
    a second modular unit movably disposed within the housing and connected with the movable corridor, the second modular unit comprising:
        a second gowning area located at an end of the second modular unit proximate to the movable corridor;
        a second controlled air, sealable, sterilizable clean room within the second modular unit, the clean room having a second entry point for personnel from the movable corridor through the second gowning area;
        a second utility room within the second modular unit at an end of the second modular unit distal to the movable corridor, the second utility room having a second point of entry for personnel that is separate from the second clean room entry point, wherein the second utility room is configured to be serviced without entering the second clean room or the movable corridor; and
        a second HVAC system within the second utility room, the second HVAC system connected with the second clean room via a second supply air duct and a second return air duct, the second HVAC system connected to the central HVAC air-handling unit.

2. The clean room system of claim 1, wherein the first modular unit comprises one or more flexible connectors for supplying the first clean room with steam.

3. The clean room system of claim 1, further comprising one or more flexible connectors for connecting the first modular unit to water, gas, cooling, and heating supplies.

4. The clean room system of claim 1, further comprising a water filtration unit located in the utility room.

5. The clean room system of claim 1, further comprising a bioreactor in the first modular unit.

6. The clean room system of claim 5, wherein the bioreactor includes at least one of a liquid handling device, a refrigerator, a tissue culture hood, or microbiology testing equipment.

7. The clean room system of claim 1, further comprising a protein unit in the second modular unit.

8. The clean room system of claim 7, wherein the protein unit includes at least one of a centrifuge, a liquid chromatography column, a spectrophotometer, or a polyacrylamide gel electrophoresis (PAGE) unit.

9. The clean room system of claim 1, further comprising a purification system in the first modular unit.

10. The clean room system of claim 1, wherein the first and second modular units are parallel to one another and project in a same direction from the movable corridor.

11. The clean room system of claim 10, wherein the first and second modular units are of equal to length to one another, distal ends of the first and second modular units being aligned.

12. The clean room system of claim 1, further comprising means for permitting movement of the first modular unit within the housing, the means for permitting movement of the first modular unit positioned under the first modular unit.

13. The clean room system of claim 12, further comprising means for permitting movement of the second modular unit within the housing, the means for permitting movement of the second modular unit positioned under the second modular unit.

* * * * *